United States Patent
Tabirian et al.

(10) Patent No.: US 9,658,512 B2
(45) Date of Patent: May 23, 2017

(54) CYCLOIDAL DIFFRACTIVE WAVEPLATE AND METHOD OF MANUFACTURE

(71) Applicants: The United States of America as Represented by the Secretary of the Army, Washington, DC (US); Beam Engineering for Advanced Measurements Co., Orlando, FL (US)

(72) Inventors: Nelson V. Tabirian, Winter Park, FL (US); Sarik R. Nersisyan, Winter Park, FL (US); Brian R. Kimball, Shrewsbury, MA (US); Diane M. Steeves, Franklin, MA (US)

(73) Assignees: Beam Engineering for Advanced Materials Co., Orlando, FL (US); The United States of America as Represented by the Secretary of the Army, Washington, DC (US)

( * ) Notice: Subject to any disclaimer, the term of this patent is extended or adjusted under 35 U.S.C. 154(b) by 138 days.

(21) Appl. No.: 14/165,615

(22) Filed: Jan. 28, 2014

(65) Prior Publication Data
US 2014/0211145 A1 Jul. 31, 2014

Related U.S. Application Data

(60) Provisional application No. 61/757,259, filed on Jan. 28, 2013.

(51) Int. Cl.
*G02F 1/29* (2006.01)
*G02F 1/1343* (2006.01)

(52) U.S. Cl.
CPC ........ *G02F 1/292* (2013.01); *G02F 1/134363* (2013.01); *Y10T 29/49155* (2015.01)

(58) Field of Classification Search
CPC ............... G02F 1/292; G02F 1/134363; G02F 2001/133757
See application file for complete search history.

(56) References Cited

U.S. PATENT DOCUMENTS 3,721,486 A 3/1973 Bramley
6,792,028 B2 9/2004 Cook
(Continued)

OTHER PUBLICATIONS

Nersisyan, et al., Optical Axis Gratings in Liquid Crystals and Their Use for Polarization Insensitive Optical Switching, Journal of Nonlinear Optical Physics & Materials, Mar. 2009, pp. 1-47, vol. 18, No. 1.

(Continued)

*Primary Examiner* — Jessica M Merlin
(74) *Attorney, Agent, or Firm* — Brian S. Steinberger; Law Offices of Brian S. Steinberger, P.A.

(57) ABSTRACT

A cycloidal diffractive waveplate (50) comprising first and second substrate layers (52, 54), a liquid crystal layer (60C, 60H) provided between the first and second substrate layers, and transparent positive electrodes (56) and transparent negative electrodes (58) provided on the first substrate layer. The liquid crystal layer has a diffractive state (60C) in which the optical axes of the liquid crystal molecules are periodically rotated across a plane of the waveplate and a non-diffractive state (60H) in which the optical axes of the liquid crystal molecules are all orientated in the same direction in the plane of the waveplate. The electrodes (56, 58) are arranged in an alternating series, such that when an electric voltage is applied to the electrodes an electric field is produced in the plane of the waveplate and the liquid crystal layer is switched from the diffractive state to the non-diffractive state. A method of manufacturing the cycloidal diffractive waveplate is also provided.

8 Claims, 22 Drawing Sheets

(56) References Cited

U.S. PATENT DOCUMENTS

| | | | |
|---|---|---|---|
| 7,319,566 B2 | 1/2008 | Prince | |
| 7,324,286 B1 | 1/2008 | Glebov | |
| 8,643,822 B2 | 2/2014 | Tan | |
| 2004/0165126 A1 | 8/2004 | Ooi | |
| 2005/0271325 A1* | 12/2005 | Anderson | G02F 1/295 385/40 |
| 2008/0278675 A1 | 11/2008 | Escuti | |
| 2009/0073331 A1* | 3/2009 | Shi | G02F 1/292 349/18 |
| 2011/0075073 A1* | 3/2011 | Oiwa | G02F 1/13718 349/76 |
| 2012/0188467 A1 | 7/2012 | Escuti | |

OTHER PUBLICATIONS

Nersisyan, et al., Polarization Insensitive Imaging Through Polarization Gratings, Optics Express, Feb. 2009, pp. 1817-1830, vol. 17, No. 3.

Sarkissian, et al., Polarization-Controlled Switching Between Diffraction Orders in Transverse-Periodically Aligned Nematic Liquid Crystals, Optics Letters, Aug. 2006, pp. 2248-2250, vol. 31, No. 15.

Dierking, Polymer Network-Stabilized Liquid Crystals, Advanced Materials, 2000, pp. 167-181, vol. 12, No. 3.

Sarkissian, et al., Periodically Aligned Liquid Crystal: Potential Application for Projection Displays, Mol. Cryst. Liq. Cryst., 2006, pp. 1-19, vol. 451.

Oise, Optics in the Southeast, Technical Conference and Tabletop Exhibit, Nov. 12-13, 2003, Orlando, FL, Optical Society of America.

Zel'Dovich, et al., Devices for Displaying Visual Information Disclosure, Jul. 200, 10 pages.

Blinov, et al., Electrooptic Effects in Liquid Crystal Materials, Springer-Verlag New York, 1994, 17 pages.

Crawford, et al., Liquid Crystals in Complex Geometries; Formed by Polymer and Porous Networks, Taylor and Francis, 1996, pp. 4-5, 4 pages.

Sarkissian, et al., Potential Application of Periodically Aligned Liquid Crystal Cell for Projection Displays, Optical Society of America, 2005, pp. 1-3.

* cited by examiner (a)

(b)

(a)

(b)

(c)

(a)

(b)

(a)

(b)

(a)

(b)

CYCLOIDAL DIFFRACTIVE WAVEPLATE AND METHOD OF MANUFACTURE

CROSS-REFERENCE TO RELATED APPLICATION

This application claims priority under 35 U.S.C. §119(e) to U.S. Provisional Patent Application No. 61/757,259, filed 28 Jan. 2013 and entitled "In Plane Switching of Cycloidal Diffractive Waveplates", and which is hereby incorporated by reference.

STATEMENT REGARDING FEDERALLY SPONSORED RESEARCH OR DEVELOPMENT

This invention was made with Government support under Contract No.: W911QY-10-C-0089.

RIGHTS OF THE GOVERNMENT

The invention described herein may be manufactured and used by or for the Government of the United States for all governmental purposes without the payment of any royalty thereon.

TECHNICAL FIELD

The invention relates to a method of manufacturing a diffractive waveplate. The invention further relates to a diffractive waveplate and an electro-optical switching system comprising the diffractive waveplate.

BACKGROUND

Liquid crystal cycloidal diffractive waveplates (CDWs) can be electro-optically switched between the diffractive/cycloidal and non-diffractive/homogeneous orientation states by an electric field applied across the liquid crystal layer, as in conventional liquid crystal phase retarders. See, for example, the following: B. Ya. Zeldovich, N. V. Tabirian, "Devices for displaying visual information", Disclosure, School of Optics/CREOL, July 2000; H. Sarkissian, J. B. Park, N. V. Tabirian, B. Ya. Zeldovich, "Periodically aligned liquid crystal: potential application for projection displays and stability of LC configuration", Optics in the Southeast 2003, Orlando, Fla.; Conference Program, PSE 02; H. Sarkissian, J. B. Park, B. Y. Zeldovich, and N. V. Tabirian, "Potential application of periodically aligned liquid crystal cell for projection displays", Proc. of CLEO/QELS Baltimore Md., p. poster JThE12, 2005; H. Sarkissian, N. Tabirian, B. Park, and B. Zeldovich, "Periodically Aligned Liquid Crystal: "Potential application for projection displays", Storming Media Report, A000824, 2004; and H. Sarkissian, B. Park, N. Tabirian, B. Zeldovich, Periodically aligned liquid crystal: potential application for projection displays", Mol. Cryst. Liquid Cryst. 451, 1-19, 2006.

FIGS. 1(a)-1(b) illustrate controlling light diffraction with the aid of a liquid crystal CDW. The liquid crystal CDW comprises first and second substrates 10 and 12, and the transparent electrodes 14 and 16. In FIG. 1(a) the liquid crystal is in a cycloidal orientation state 18C and diffracts light, while in FIG. 1(b) the liquid crystal is oriented into a homeotropic, non-diffractive, state by the application of an electric field across the liquid crystal layer with the aid of transparent electrodes 14 and 16 coated on the surfaces of the substrates 10 and 12, respectively. However, in practice this system has drawbacks. Out-of-plane reorientation of CLCs with an electric field is accompanied by generation of defects, strong light scattering, hysteresis and long transients. The elastic forces that build up the modulated structure of the liquid crystal optical axis prove strong enough to prefer formation of orientation discontinuities and textures, particularly, as transient states, rather than establishing homogeneous distribution of optical axis orientation. Stabilizing the CLC structure with a polymer network suppresses texture formation, but at the expense of much higher electric field requirement for switching the system.

Accordingly, electrically induced reorientation of liquid crystal in a CDW is neither smooth nor as fast as one would expect from a thin layer of non-linear liquid crystal. We suggested therefore, as an alternative to electrically switching liquid crystals CDWs, using an electrically controlled liquid crystal phase retarder for switching the diffraction of light by a CDW, as reported in H. Sarkissian, S. V. Serak, N. Tabiryan, L. B. Glebov, V. Rotar, and B. Y. Zeldovich, "Polarization-controlled switching between diffraction orders in transverse-periodically aligned nematic liquid crystals", Optics Letters 31, 2248-2250, 2006. The phase retarder switches the state of polarization between right- and left-circular thus switching the light diffracted by a CDW between $+1^{st}$ and $-1^{st}$ orders.

SUMMARY

Applicants have realized that while use of the aforementioned phase retarder does switch the state of polarization between right- and left-circular, thus switching the light diffracted by a CDW between +1st and −1st orders, in order to eliminate the diffraction altogether—a desirable feature—one still needs to switch the liquid crystal of the CDW itself between cycloidal and homogeneous orientation states.

A first aspect of the invention provides a method of fabricating a cycloidal diffractive waveplate. The method comprises forming a first substrate layer. A plurality of transparent positive electrodes and a plurality of transparent negative electrodes are formed on the first substrate layer. The electrodes are arranged in an alternating series. The method comprises forming a second substrate layer. The method comprises forming a liquid crystal layer between the first substrate layer and the second substrate layer. The liquid crystal layer is formed of liquid crystal molecules each having an optical axis. The liquid crystal layer is formed with a periodic molecular structure. The liquid crystal layer has a diffractive state in which the optical axes of the liquid crystal molecules are periodically rotated across a plane of the waveplate. The liquid crystal layer also has a non-diffractive state in which the optical axes of the liquid crystal molecules are orientated in the same direction in the plane of the waveplate.

Fabricating the cycloidal diffractive waveplate, CDW, to have the electrodes on only one substrate layer enables an electric field to be applied to the liquid crystal layer in the plane of the CDW. This may enable the liquid crystal layer to be switched between the diffractive and non diffractive states with minimal generation of orientation discontinuities and textures in the liquid crystal structure, and with less light scattering and shorter transients, than is possible with out-of-plane switching, and without hysteresis. The reorientation that maintains the optical axis of the LC in the plane of the cell generates much smaller deformation energy compared to out-of-plane alignment, particularly, since the orientation of the LC in a CDW is parallel to the applied field or makes a small angle with respect to the field in substantial portions of the cell. Fabricating the CDW in this way may enable fast and fully reversible switching of the CDW in operation.

In an embodiment, the plurality of transparent positive electrodes and the plurality of transparent negative electrodes are formed by forming a layer of a transparent conductive material on the first substrate layer and etching an electrode pattern into the layer of the transparent conductive material. This may enable the liquid crystal layer to be switched between the diffractive and non-diffractive states with fewer orientation discontinuities and textures in the liquid crystal structure, and with less light scattering and shorter transients, than is possible with out-of-plane switching, and without hysteresis. Fabricating the CDW in this way may enable fast and fully reversible switching of the CDW in operation.

In an embodiment, transparent positive electrodes and/or transparent negative electrodes are formed by direct deposition of a transparent conductive material onto the first substrate layer. Fabricating the electrodes by direct deposition may further improve the performance of the CDW, and may improve both diffraction efficiency and switching dynamics as compared to fabricating the electrodes by etching the electrode pattern.

In an embodiment, transparent positive electrodes and transparent negative electrodes are formed by physical vapour deposition of a transparent conductive material onto the first substrate layer.

In an embodiment, the electrodes are arranged in the alternating series across the first substrate layer in a first direction. The liquid crystal layer has a modulation axis which is orientated in a second direction, substantially perpendicular to the first direction, within the plane of the waveplate. This may enable diffraction induced by the liquid crystal molecules to be differentiated from diffraction induced by the electrodes.

In an embodiment, the transparent conductive material is Indium-tin-oxide.

In an embodiment, the first substrate layer and the second substrate layer are each one of optically transmissive and optically transparent.

In an embodiment, the first substrate layer and the second substrate layer are each made of one of float glass and fused silica.

A second aspect of the invention provides a cycloidal diffractive waveplate comprising a first substrate layer, a second substrate layer, a liquid crystal layer, a plurality of transparent positive electrodes and a plurality of transparent negative electrodes. The liquid crystal layer is provided between the first substrate layer and the second substrate layer. The liquid crystal layer is formed of liquid crystal molecules each having an optical axis. The liquid crystal layer can have a periodic molecular structure. The liquid crystal layer has a diffractive state in which the optical axes of the liquid crystal molecules are periodically rotated across a plane of the waveplate. The liquid crystal layer also has a non-diffractive state in which the optical axes of the liquid crystal molecules are all orientated in the same direction in the plane of the waveplate. The plurality of transparent positive electrodes and the plurality of transparent negative electrodes are provided on the first substrate layer. The plurality of transparent positive electrodes and the plurality of transparent negative electrodes are arranged in an alternating series, such that when an electric voltage is applied to the electrodes an electric field is produced in the plane of the waveplate and the liquid crystal layer is switched from the diffractive state to the non-diffractive state.

Providing the electrodes on the same substrate layer enables an electric field to be applied to the liquid crystal layer in the plane of the CDW. This may enable the liquid crystal layer to be switched between the diffractive and non-diffractive states with minimal generation of orientation discontinuities and textures in the liquid crystal structure, and with less light scattering and shorter transients, than is possible with out-of-plane switching, and without hysteresis. The reorientation that maintains the optical axis of the LC in the plane of the cell generates much smaller deformation energy compared to out-of-plane alignment, particularly, since the orientation of the LC in a CDW is parallel to the applied field or makes a small angle with respect to the field in substantial portions of the cell. This construction may enable fast and fully reversible switching of the CDW.

In an embodiment, the electrodes comprise a transparent conductive material provided on the first substrate layer and etched to form the alternating series of positive and negative electrodes. This may enable the liquid crystal layer to be switched between the diffractive and non-diffractive states with fewer orientation discontinuities and textures in the liquid crystal structure, and with less light scattering and shorter transients, than is possible with out-of-plane switching, and with no hysteresis. This may enable fast and fully reversible switching of the CDW in operation.

In an embodiment, electrodes comprise a transparent conductive material directly deposited on the first substrate layer to form the electrodes. This may further improve the performance of the CDW, and may improve both diffraction efficiency and switching dynamics as compared to etched electrodes.

In an embodiment, an electrode comprises a transparent conductive material directly deposited on the first substrate layer by physical vapour deposition.

In an embodiment, the electrodes are arranged in the alternating series across the first substrate layer in a first direction. The liquid crystal layer has a modulation axis which is orientated in a second direction, substantially perpendicular to the first direction, within the plane of the waveplate. This may enable diffraction induced by the liquid crystal molecules to be differentiated from diffraction induced by the electrodes.

In an embodiment, the transparent conductive material is Indium-tin-oxide.

In an embodiment, the first substrate layer and the second substrate layer are each one of optically transmissive and optically transparent.

In an embodiment, the first substrate layer and the second substrate layer are each made of one of float glass and fused silica.

In an embodiment, the plurality of transparent positive electrodes and the plurality of transparent negative electrodes are arranged such that when the electric voltage is removed, the electric field is removed and the liquid crystal layer switches from the non-diffractive state to the diffractive state.

A third aspect of the invention provides an electro-optic switching system comprising a cycloidal diffractive waveplate and a controller. The waveplate comprises a first substrate layer, a second substrate layer, a liquid crystal layer, a plurality of transparent positive electrodes and a plurality of transparent negative electrodes. The liquid crystal layer is provided between the first substrate layer and the second substrate layer. The liquid crystal layer is formed of liquid crystal molecules each having an optical axis. The liquid crystal layer has a periodic molecular structure. The liquid crystal layer has a diffractive state in which the optical axes of the liquid crystal molecules are periodically rotated across a plane of the waveplate. The liquid crystal layer also has a non-diffractive state in which the optical axes of the liquid crystal molecules are all orientated in the same direction in the plane of the waveplate. The plurality of transparent positive electrodes and the plurality of transparent negative electrodes are provided on the first substrate layer. The plurality of transparent positive electrodes and the plurality of transparent negative electrodes are arranged in an alternating series, such that when an electric voltage is applied to the electrodes an electric field is produced in the plane of the waveplate and the liquid crystal layer is switched from the diffractive state to the non-diffractive state. The controller is arranged to deliver an electric voltage to the electrodes of the waveplate.

Providing the electrodes on only one substrate layer enables an electric field to be applied to the liquid crystal layer in the plane of the CDW. This may enable the liquid crystal layer to be switched between the diffractive and non-diffractive states with minimal generation of orientation discontinuities and textures in the liquid crystal structure, and with less light scattering and shorter transients, than is possible with out-of-plane switching, and without hysteresis. The reorientation that maintains the optical axis of the LC in the plane of the cell generates much smaller deformation energy compared to out-of-plane alignment, particularly, since the orientation of the LC in a CDW is parallel to the applied field or makes a small angle with respect to the field in substantial portions of the cell. This construction may enable fast and fully reversible switching of the CDW.

In an embodiment, the electrodes comprise a transparent conductive material provided on the first substrate layer and etched to form the alternating series of positive and negative electrodes. This may enable the liquid crystal layer to be switched between the diffractive and non-diffractive states with fewer orientation discontinuities and textures in the liquid crystal structure, and with less light scattering and shorter transients, than is possible with out-of-plane switching, and without hysteresis. This may enable fast and fully reversible switching of the CDW in operation.

In an embodiment, the electrodes comprise a transparent conductive material directly deposited on the first substrate layer to form electrodes. This may further improve the performance of the CDW, and may improve both diffraction efficiency and switching dynamics as compared to etched electrodes.

In an embodiment, the electrodes comprise a transparent conductive material directly deposited on the first substrate layer by physical vapour deposition to form electrodes.

In an embodiment, the electrodes are arranged in the alternating series across the first substrate layer in a first direction. The liquid crystal layer has a modulation axis which is orientated in a second direction, substantially perpendicular to the first direction, within the plane of the waveplate. This may enable diffraction induced by the liquid crystal molecules to be differentiated from diffraction induced by the electrodes.

In an embodiment, the transparent conductive material is Indium-tin-oxide.

In an embodiment, the first substrate layer and the second substrate layer are each one of optically transmissive and optically transparent.

In an embodiment, the first substrate layer and the second substrate layer are each made of one of float glass and fused silica.

In an embodiment, the plurality of transparent positive electrodes and the plurality of transparent negative electrodes are arranged such that when the electric voltage is removed, the electric field is removed and the liquid crystal layer switches from the non-diffractive state to the diffractive state.

Several aspects of the invention are described above, in varying detail as to the features of each of the aspects. Any of the features of one of the aspects can be included as an additional or alternative feature of any of the other aspects, practices or embodiments of the disclosure described herein, except where clearly mutually exclusive with another feature of an aspect, practice or embodiment or where a statement is explicitly made herein that certain features will not work in such a combination. To avoid undue repetition and length of the disclosure, every possible combination is not explicitly recited. Furthermore, as the skilled worker can ascertain, a method of the present disclosure can comprise the steps relating to the function or operation of the features of apparatus and systems disclosed herein.

DETAILED DESCRIPTION

Figure 1:
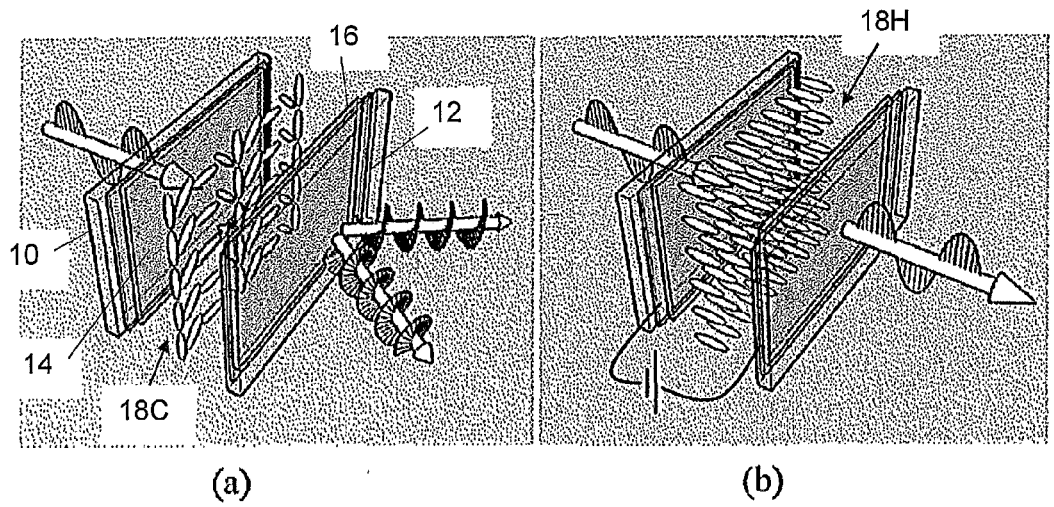
FIG. 1 shows a prior art liquid crystal cycloidal diffractive waveplate in which switching between a) the cycloidal/diffractive state and b) the homeotropic/non-diffractive state is induced by an electric field applied across the liquid crystal layer.
Figure 2:
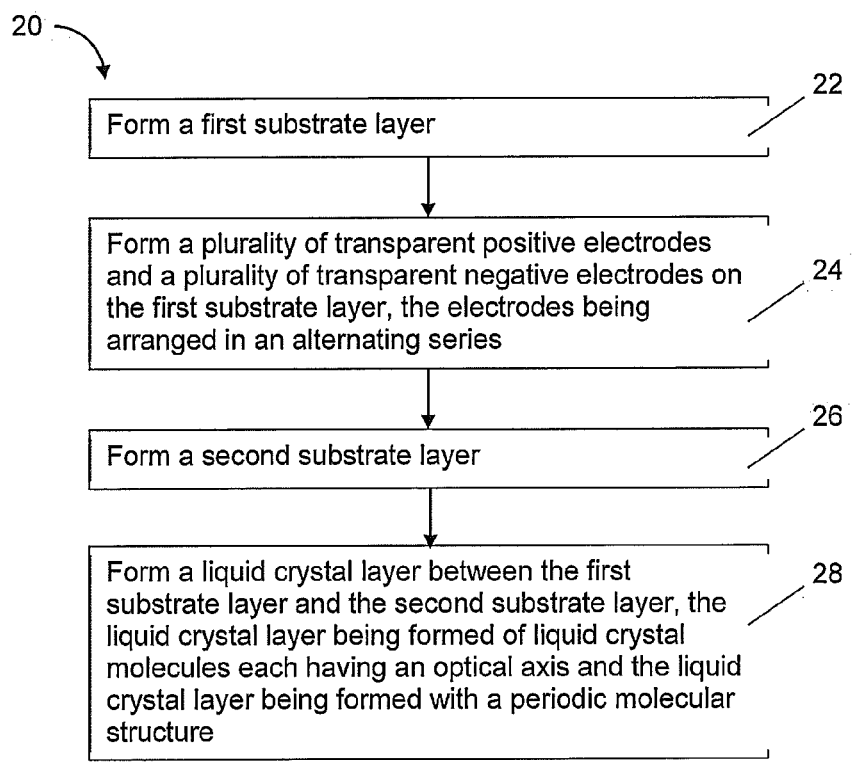
FIG. 2 shows the steps of a method according to a first embodiment of the invention of fabricating a cycloidal diffractive waveplate.

Referring to FIG. 2, a first embodiment of the invention provides a method 20 of fabricating a cycloidal diffractive waveplate, CDW.

The method 20 comprises forming a first substrate layer 22 and forming a second substrate layer 26. A plurality of transparent positive electrodes and a plurality of transparent negative electrodes are formed on the first substrate layer. The electrodes are arranged in an alternating series, for example positive, negative, positive, etc. It will be understood that both the first and second substrate layers may be formed, and the electrodes then formed on the first substrate layer, or the first substrate layer may be formed and the electrodes formed on it before then forming the second substrate layer.

A liquid crystal, LC, layer is formed between the first substrate layer and the second substrate layer 28. The LC layer is formed of liquid crystal molecules each having an optical axis. The LC layer is formed with a periodic molecular structure. The LC layer has a cycloidal state and a homeotropic state. In the cycloidal state the optical axes of the liquid crystal molecules are periodically rotated across a plane of the waveplate. In the homeotropic state the optical axes of the liquid crystal molecules are all orientated in the same direction in the plane of the waveplate. The liquid crystals may be switched from their cycloidal state to their homeotropic state on application of a voltage to the electrodes, causing an electric field to be formed in the plane of the CDW.

Figure 3:
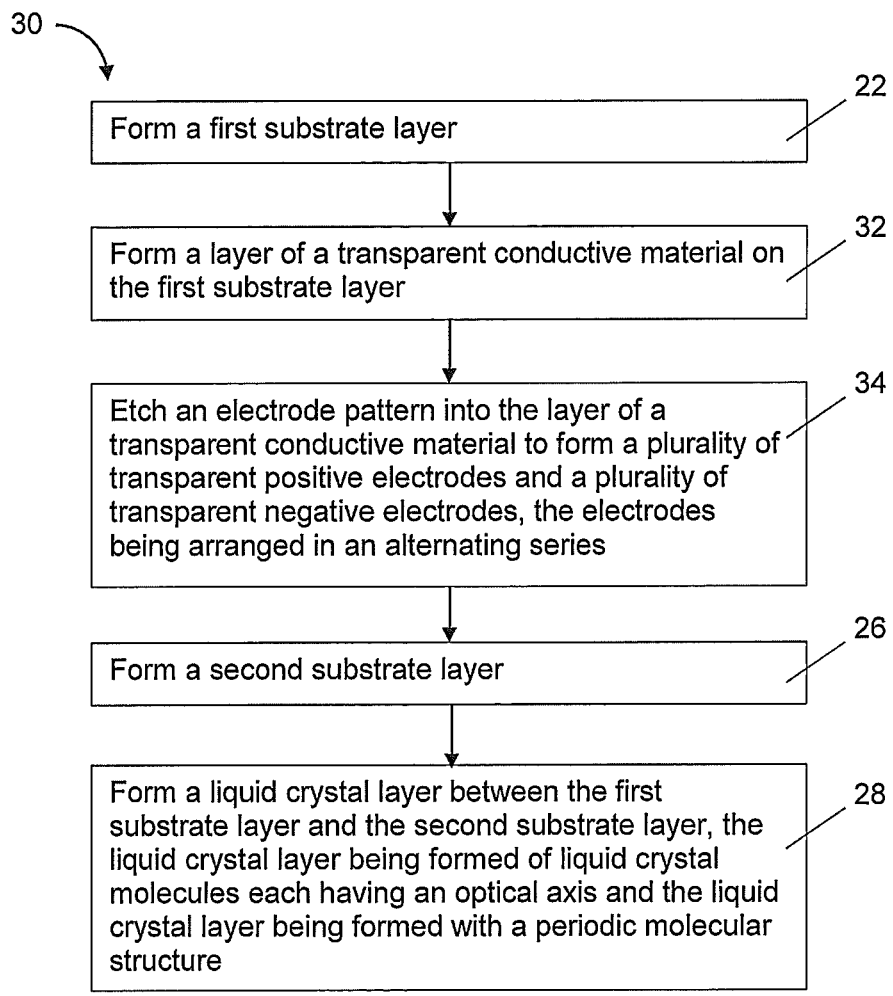
FIG. 3 shows the steps of a method according to a second embodiment of the invention of fabricating a cycloidal diffractive waveplate.

A second embodiment of the invention provides a method 30 of fabricating a cycloidal diffractive waveplate, CDW, having the steps shown in FIG. 3. The method 30 of this embodiment is similar to the method 20 of the first embodiment, with the following modifications. The same reference numbers are retained for corresponding steps.

In this embodiment, the transparent positive electrodes and the transparent negative electrodes are formed by first forming a layer of a transparent conductive material on the first substrate layer 32. An electrode pattern is then etched into the layer of transparent conductive material, to form an alternating series of positive and negative electrodes 34.

Figure 4:
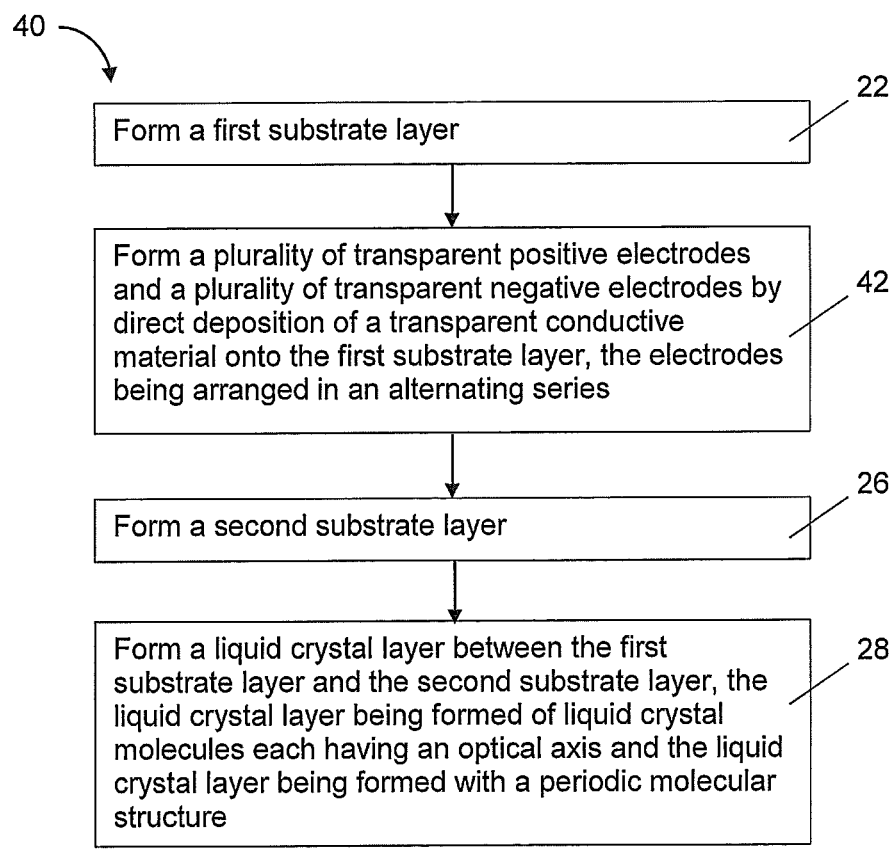
FIG. 4 shows the steps of a method according to a third embodiment of the invention of fabricating a cycloidal diffractive waveplate.

A third embodiment of the invention provides a method 40 of fabricating a cycloidal diffractive waveplate, CDW, having the steps shown in FIG. 4. The method 40 of this embodiment is similar to the method 20 of the first embodiment, with the following modifications. The same reference numbers are retained for corresponding steps.

In this embodiment, the transparent positive electrodes and the transparent negative electrodes are formed by direct deposition of a transparent conductive material, such as Indium-tin-oxide, ITO, onto the first substrate layer.

A fourth embodiment of the invention provides a method of fabricating a cycloidal diffractive waveplate, CDW, which is similar to the method 20 of the first embodiment, with the following modifications, and will be described with reference to FIG. 2.

In this embodiment, the electrodes are arranged in the alternating series across the first substrate layer in a first direction. The liquid crystal layer has a modulation axis which is orientated in a second direction, substantially perpendicular to the first direction, within a plane of the cycloidal diffractive waveplate.

Figure 5:
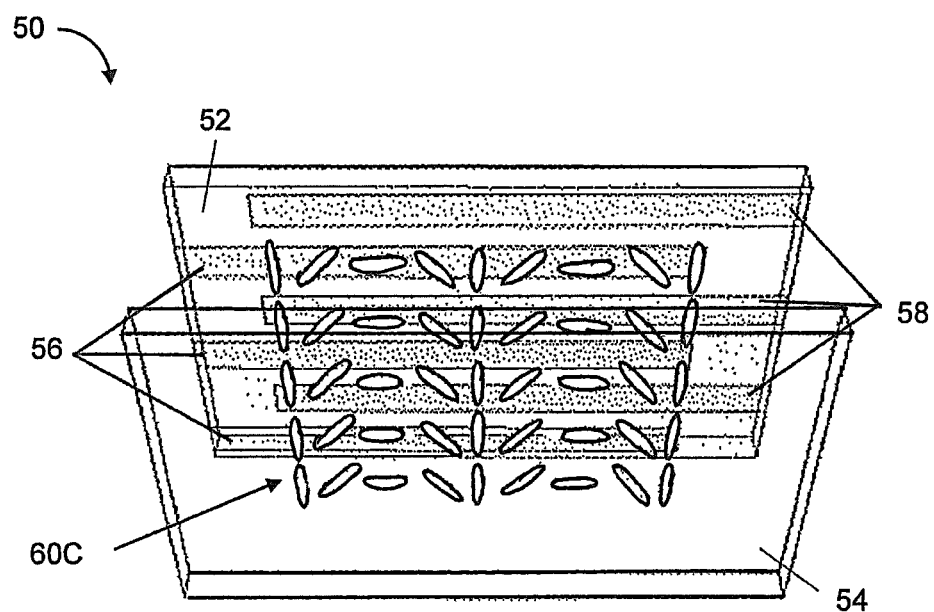
FIG. 5 is an exploded diagrammatic representation of a cycloidal diffractive waveplate according to a fifth embodiment of the invention.
Figure 5:
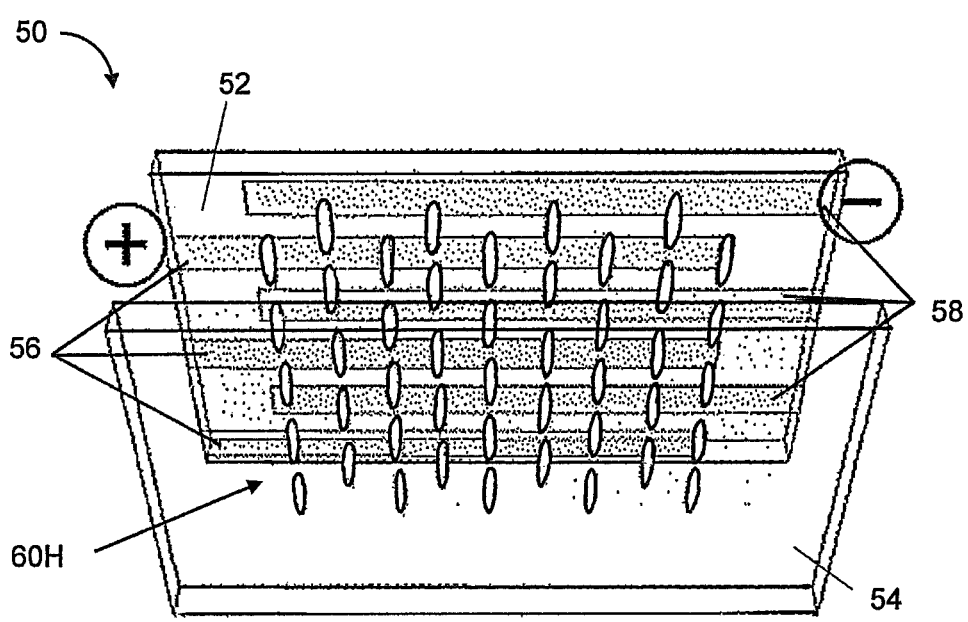

A fifth embodiment of the invention provides a cycloidal diffractive waveplate, CDW, 50 as shown in FIG. 5.

The CDW 50 comprises a first substrate layer 52, a second substrate layer 54, a liquid crystal layer provided between the first substrate layer and the second substrate layer, and a plurality of transparent positive electrodes 56 and a plurality of transparent negative electrodes 58.

The liquid crystal layer 60 is formed of liquid crystal molecules each having an optical axis and has a periodic molecular structure. The liquid crystal layer has a cycloidal state 60C, shown in FIG. 5(*a*), in which the optical axes of the liquid crystal molecules are periodically rotated across the plane of the waveplate. The liquid crystal layer also has a homeotropic state 60H, shown in FIG. 5(*b*), in which the optical axes of the liquid crystal molecules are all orientated in the same direction in the plane of the waveplate.

The transparent positive electrodes 56 and the transparent negative electrodes 58 are provided on the first substrate layer 52. The electrodes 56, 58 are arranged in an alternating series, in this example: negative, positive, negative, positive, negative, positive.

The arrangement of the electrodes 56, 58 on the first substrate layer ensures that when an electric voltage is applied to the electrodes an electric field is produced across the liquid crystal layer 60, in the plane of the waveplate and the liquid crystal layer is switched from the cycloidal state 60C to the homeotropic state 60H. The liquid crystal molecules are oriented planarly upon application of the in-plane electric field. The reorientation of the liquid crystal molecules therefore maintains the optical axis of the liquid crystal molecules in the plane of the CDW 50, this is referred to as in-plane switching. This generates a much smaller deformation energy compared to out-of-plane reorientation, particularly, since the orientation of the liquid crystal molecules in the CDW 50 is parallel to the applied field or makes a small angle with respect to the field in substantial portions of the CDW.

Referring to FIGS. 6 to 14, a sixth embodiment of the invention provides a CDW having the same general structure as shown in FIG. 5. In this embodiment, the positive and negative transparent electrodes 56, 58 comprise a transparent conductive material, such as ITO, provided on the first substrate layer 52, a float glass substrate in this example, which has been etched to form the alternating series of positive and negative electrodes.

Figure 6:
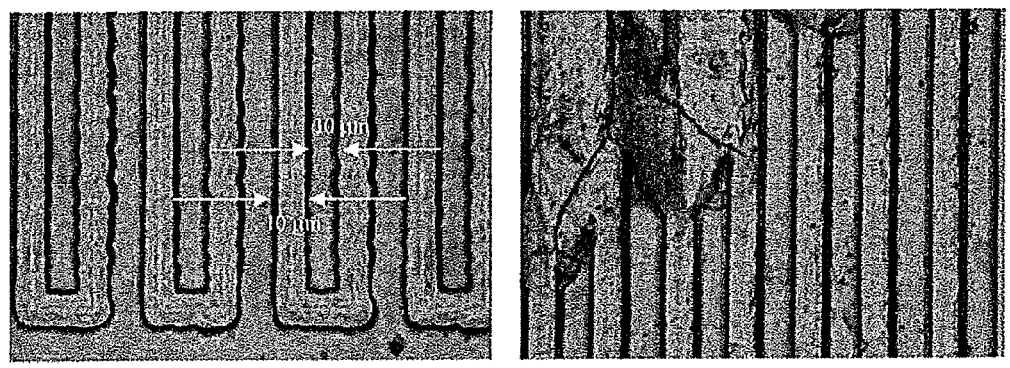
FIG. 6 shows photographs taken under an optical microscope of an etched electrode pattern in ITO on a first substrate of a cycloidal diffractive waveplate according to a sixth embodiment of the invention.
Figure 7:
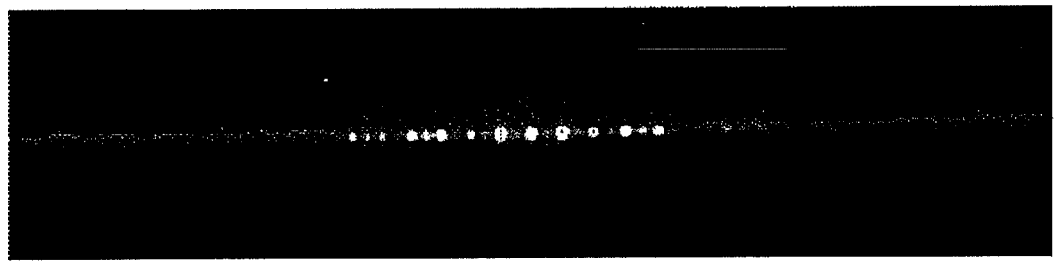
FIG. 7 shows a diffraction pattern of a He—Ne laser beam of 633 nm wavelength transmitted through the first substrate shown in FIG. 6.

FIG. 6 shows photographs taken under a microscope of the microstructure of the ITO-patterned first substrate layer. The width as well as the etched gap between the electrodes was 10 μm. The photographs reveal defects and impurities at different parts of the ITO-patterned area associated, apparently, with the etching process. The substrate looked hazy even by naked eye. FIG. 7 shows a diffraction pattern of a He—Ne laser beam of 633 nm wavelength transmitted through the first substrate shown in FIG. 6. As can be seen, diffraction of the laser beam by the first substrate resulted in a practically continuous and hazy line instead of well defined diffraction orders that would be expected to be created by the periodic structure of the ITO electrodes. Indeed, one should expect that all imperfections would be greatly amplified and visible in the diffraction of light by CDW having a substrate such as this.

Figure 8:
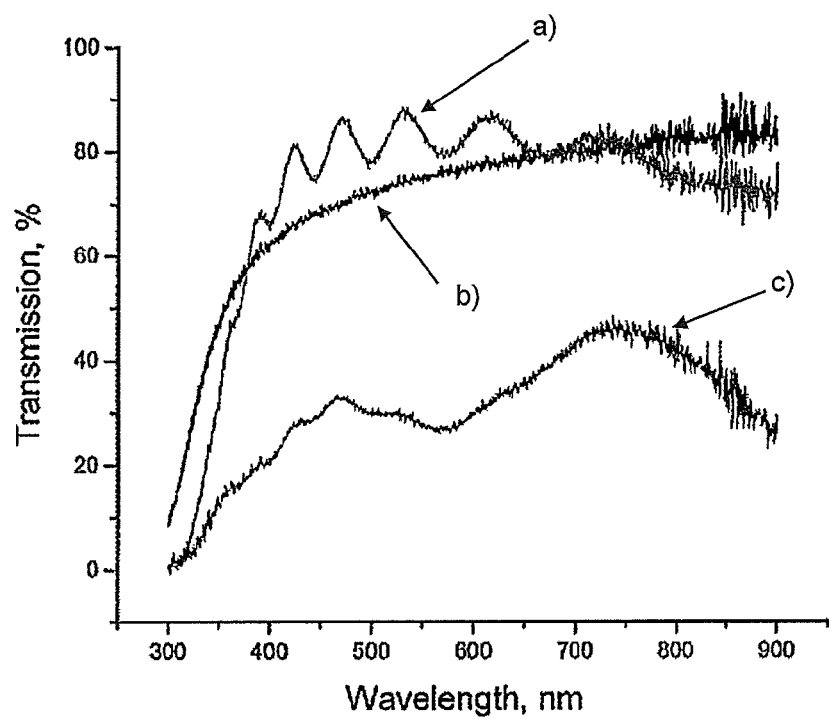
FIG. 8 shows optical spectra of the first substrate shown in FIG. 6 taken at a) an ITO-etched area of the first substrate, b) an area of uniform ITO on the first substrate (electrical contact area) and c) an ITO free area of the first substrate.

The optical quality of the patterning is well characterized by the optical spectra taken at different areas of the first substrate: ITO-patterned; plane ITO (the contact area), and in the area with no ITO at all, as shown in FIG. 8.

The CDW of the sixth embodiment was constructed using the first substrate layer, shown in FIG. 6, on which the alternating series of ITO positive and negative electrodes was provided, and a second substrate layer in the form of a fused silica substrate with ultraviolet-visible anti-reflective, UV-VIS AR, coatings on both sides. The fused silica substrate has a thickness of 3 mm and is 25 mm in diameter. Both substrates were spin coated by a photoalignment material (PAAD-22) at 3000 rpm speed for 60 s. The CDW cell was then assembled with no spacers and exposed to overlapping right- and left-circular polarized beams of a He—Cd laser beam of 325 nm wavelength for 15 minutes. The intensity of illumination was 8 mW/cm$^2$. A nematic liquid crystal, 6CHBT, having a dielectric anisotropy of $\Delta \in =+10$ was then filled into the cell by capillary action. As will be understood by one of ordinary skill, cognizant of the disclosure herein, the incorporation of a photoalignment material can be a feature of any of the embodiments described herein, including both methods and apparatus.

Figure 9:
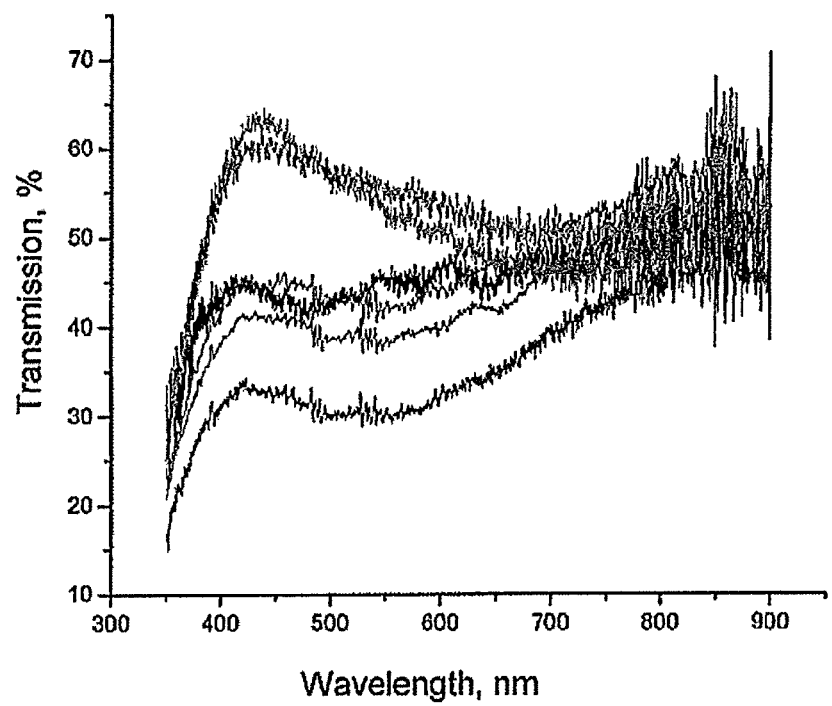
FIG. 9 shows optical spectra of the cycloidal diffractive waveplate, CDW, of the sixth embodiment of the invention, taken at different positions on the CDW.

Transmission spectra of the resulting CDW are shown in FIG. 9. Different curves correspond to spectra taken at different areas of the CDW cell, and they demonstrate inhomogeneity of the thickness of the CDW. Note that the higher the diffraction efficiency, the lower is the transmission of the CDW. The diffraction efficiency of the CDW is relatively low as one would expect due to imperfect alignment conditions on the substrates used for its fabrication.

The modulation axis of the CDW was chosen to be perpendicular to the electrode pattern as shown in FIG. 5(*a*) so as to easily differentiate the diffraction induced by the CDW in the horizontal direction (as shown in the drawing) from the diffraction pattern of the electrodes in the vertical direction.

Figure 10:
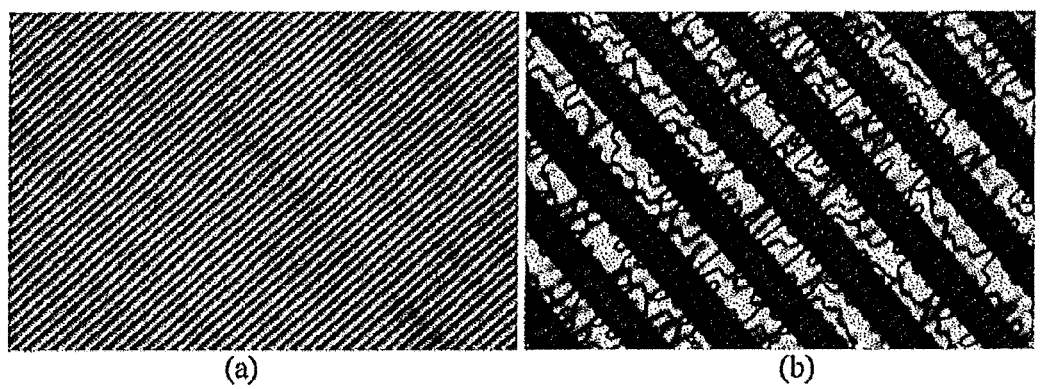
FIG. 10 shows polarizing microscopy photographs of the CDW of the sixth embodiment taken at (a) an area of uniform ITO on the first substrate, and (b) a patterned ITO area.

The effect of imperfect boundary conditions on the alignment of the liquid crystal molecules was checked using a liquid crystal polymer, LCP, CDW. Photographs of the microstructure of the LCP CDW taken under a polarizing microscope are shown in FIG. 10. Perfect alignment is achieved in the area of uniform ITO and even on patterned ITO. However, strong distortions are present in the etched areas and near the edges of the electrodes.

Figure 11:
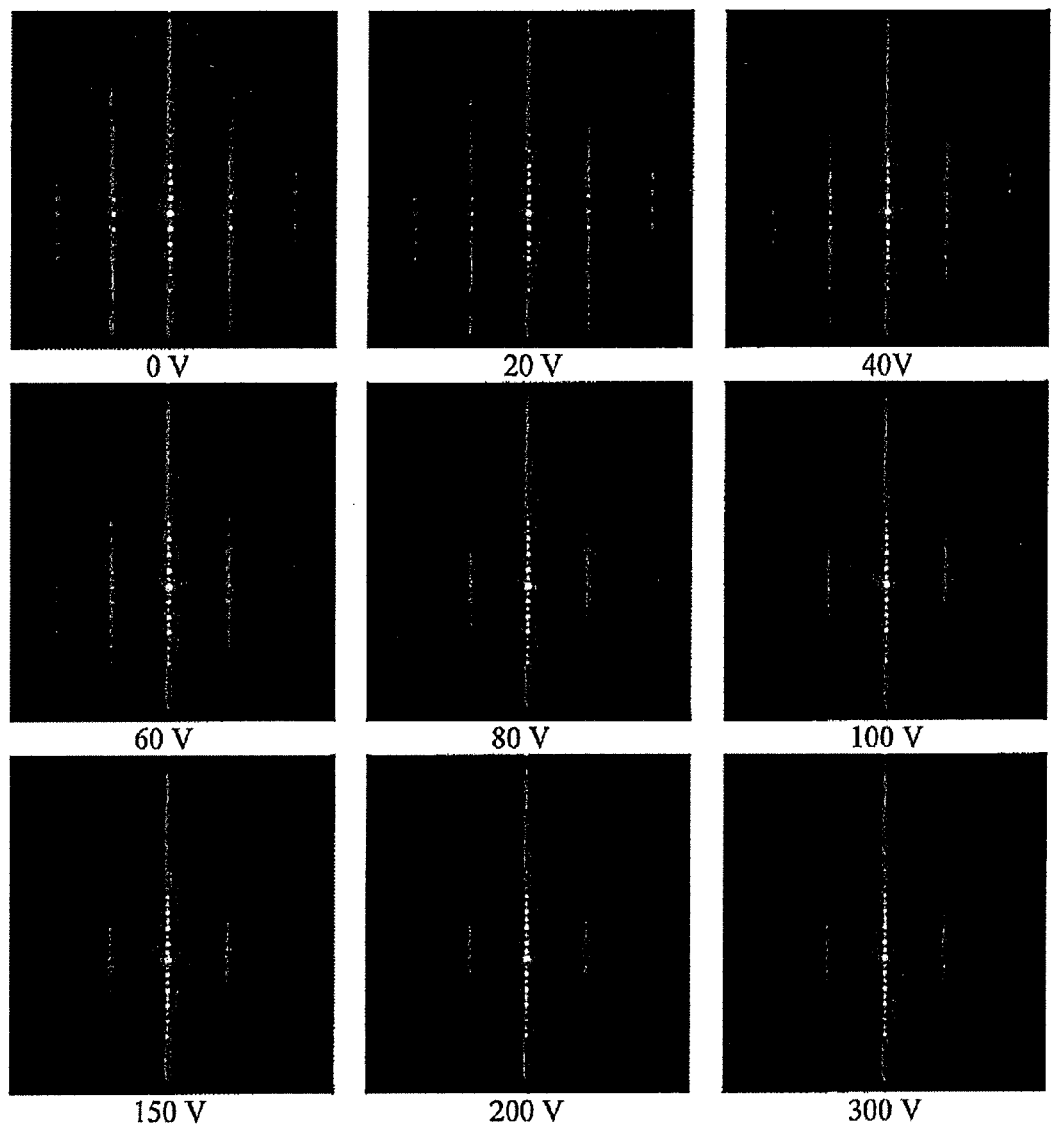
FIG. 11 shows diffraction patterns of a 633 nm He—Ne laser beam transmitted through the CDW of the sixth embodiment, for different peak-peak voltages (1 kHz AC) applied to the electrodes on the first substrate.

Diffraction of the CDW was tested with a He—Ne laser beam of 633 nm wavelength. The diffraction pattern was captured by a CCD camera on a screen at a distance of 50 cm. FIG. 11 shows photographs of the diffraction pattern obtained for different peak-to-peak voltages, ranging from 0V to 300V, applied to the electrodes on the first substrate layer of the CDW. Note again that the diffraction orders in the vertical direction (of the photographs) are caused by the ITO electrode pattern, and the diffraction orders in the horizontal direction are associated with the CDW, that is to say the diffraction caused by the liquid crystal within the CDW. Note also that the 0$^{th}$ order diffraction would have been absent for a good quality CDW at the absence of voltage and at fulfilment of the half-wave phase retardation condition at 633 nm wavelength. The photographs show, however, a rather strong 0$^{th}$ order. Increasing the voltage results in decreasing intensity of the 1$^{st}$ order diffracted beams. The diffraction stays appreciably strong even at high voltages. Sinusoidal modulation of the voltage at 1 kHz was used in the tests.

Figure 12:
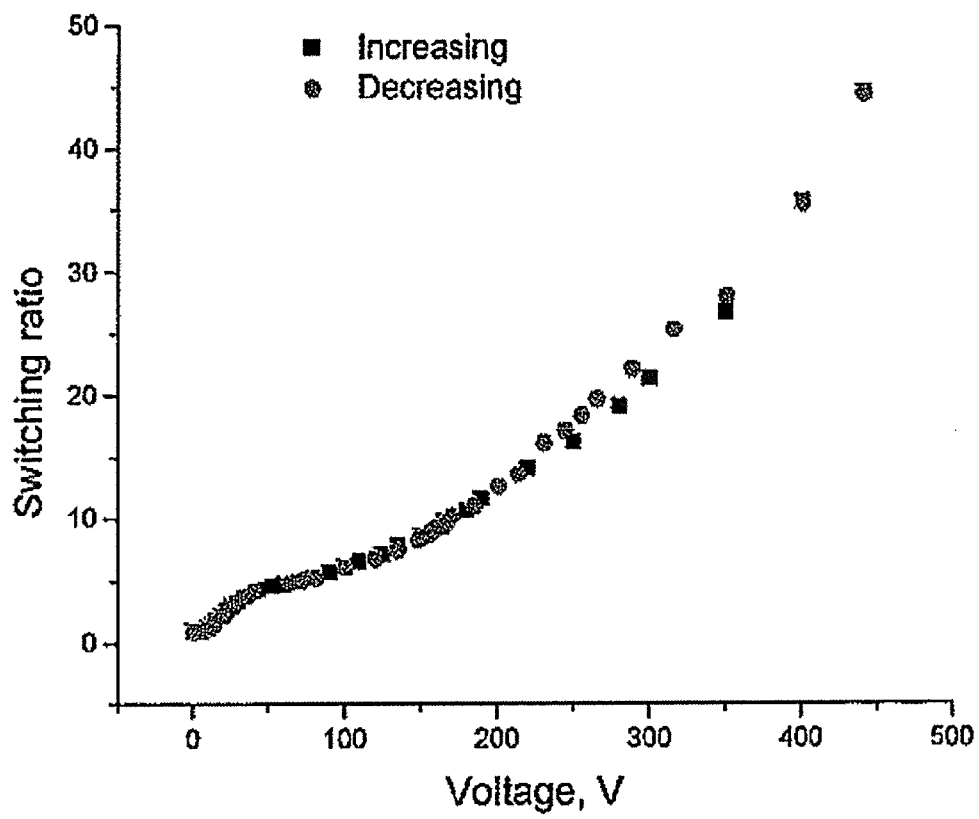
FIG. 12 shows switching ratio as a function of voltage, V, applied to the CDW of the sixth embodiment.

The decreasing diffraction efficiency was characterized by measuring the power of the 1$^{st}$ order diffracted beam as a function of the peak-to-peak voltage applied to the CDW. FIG. 12 shows the factor of decrease (switching ratio) in the diffracted beam power. Performing the measurements both when increasing as well as decreasing the voltage we verified the absence of hysteresis. Thus, in-plane switching of the CDW is fully reversible.

Figure 13:
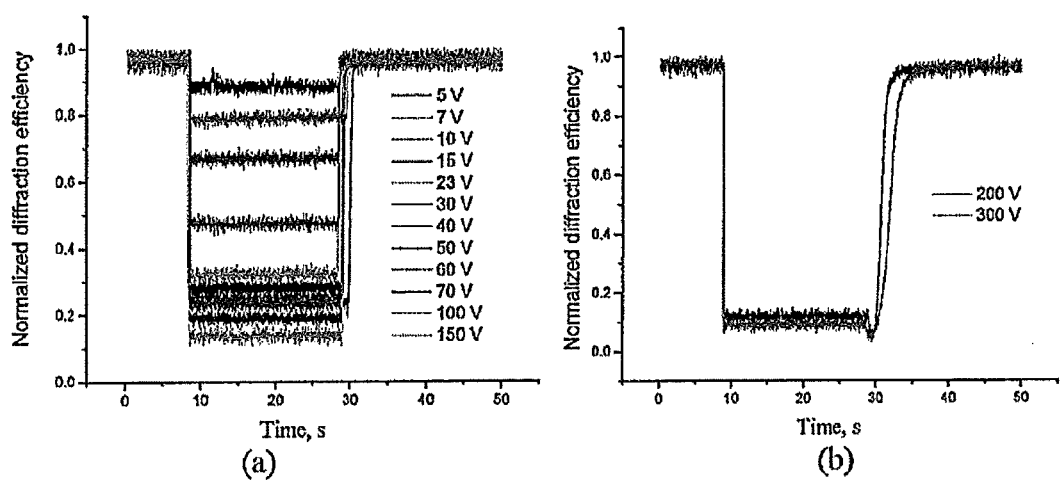
FIG. 13 shows the normalized diffraction efficiency as a function of time, s, for (a) voltages in the range 5V to 150V and (b) 200V and 300V, of the CDW of the sixth embodiment.
Figure 14:
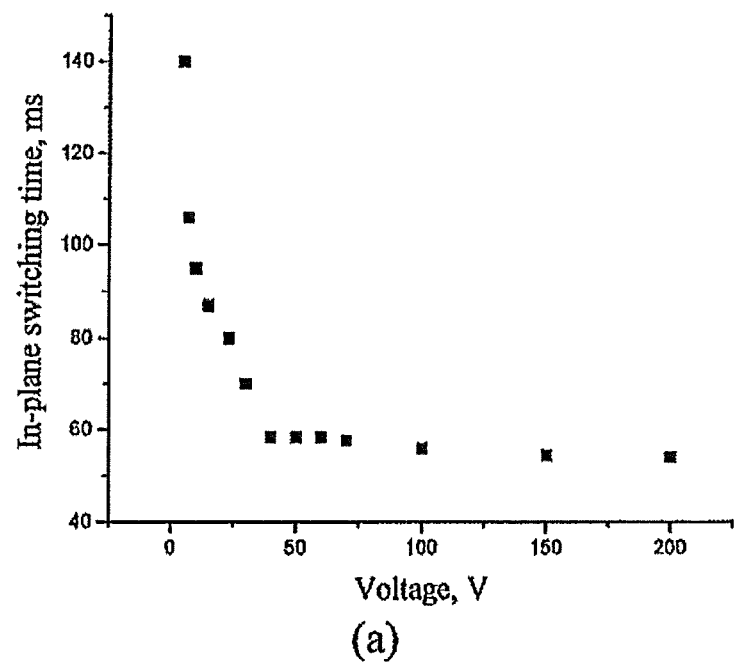
FIG. 14 shows (a) in-plane switching time, ms, (b) in-plane relaxation time, ms, and (c) their total, as a function of peak-peak voltage applied to the CDW of the sixth embodiment.
Figure 14:
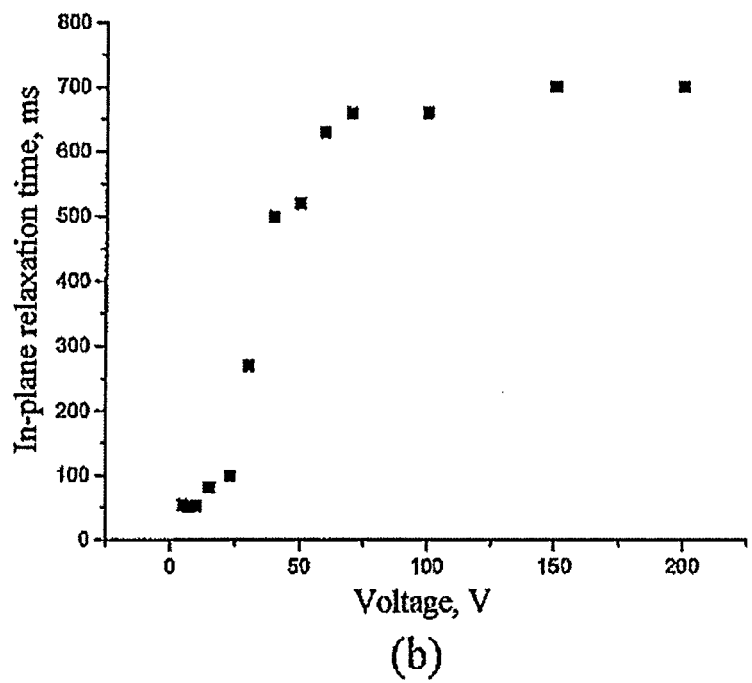
Figure 14:
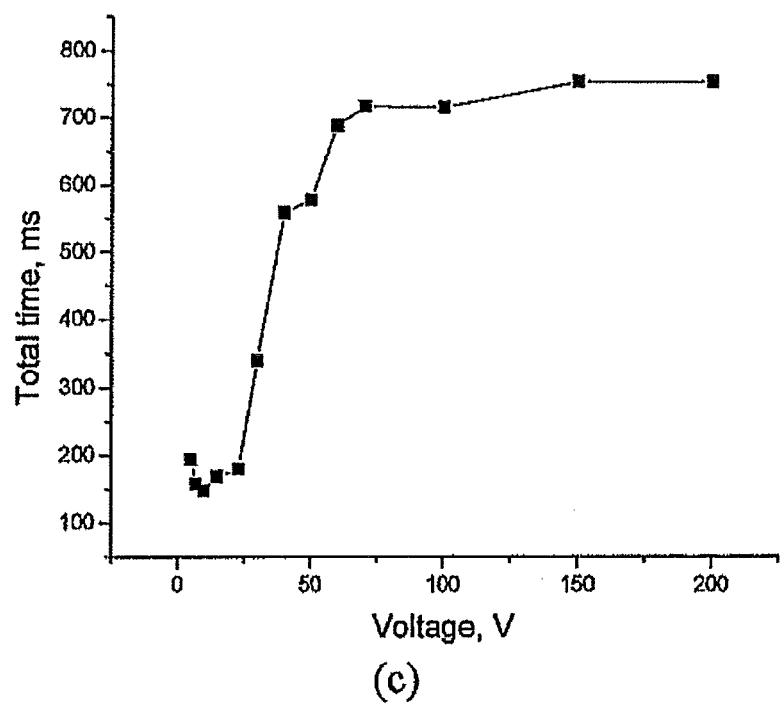

The reversibility of in-plane switching of the CDW is apparent also in the switching dynamics, shown in FIG. 13. As can be seen in FIG. 10(*b*), at high voltage values, V>200

V, a long transient time starts setting in that may be understood in terms of generation of orientation defects.

In-plane switching and relaxation times as a function of applied voltage are shown in FIGS. 14(a) and 14(b). The switching process becomes faster at increasing voltage, and stabilizes at nearly 50 ms for voltages equal or higher than 40V. The relaxation time is ~100 ms at low voltages while transient processes, similar to those which occur in CLCs, slow the relaxation time down to ~1 s at higher voltage values. The total of the switching and relaxation times shows a minimum of ~150 ms for a low voltage, FIG. 14(c).

Figure 15:
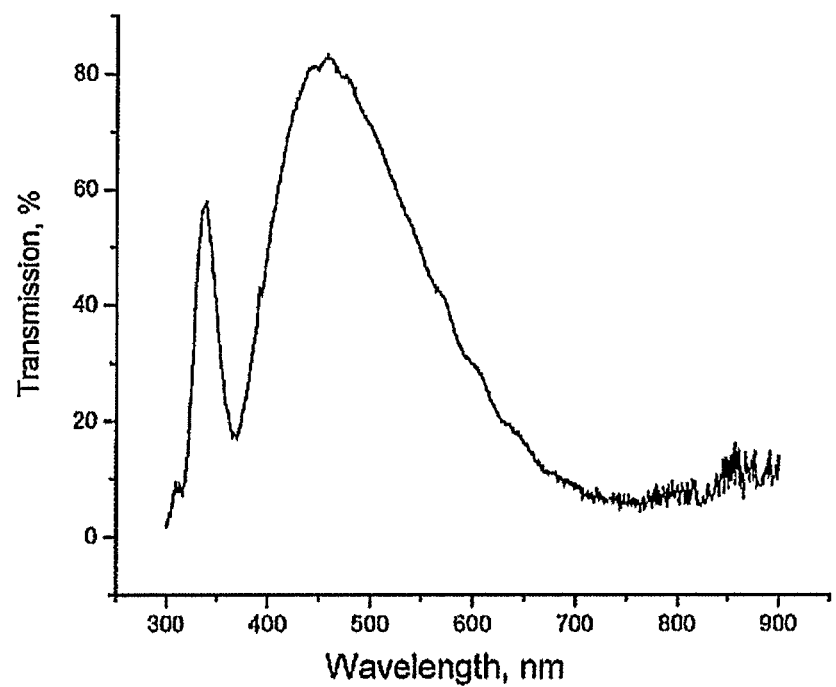
FIG. 15 shows the optical transmission spectrum of a CDW in which a uniform ITO electrode arranged for out-of-plane switching is provided on each of the first and second substrates.

Referring to FIGS. 15 to 20, in order to compare with in-plane switching, we fabricated and studied electro-optical switching of a CDW having two uniform ITO coated glass substrates (out-of-plane switching). The transmission spectrum of this CDW (which does not form an embodiment of the invention) is shown in FIG. 15.

Note that the high quality of the substrates, due to the lack of etching related defects, allows a high diffraction efficiency to be obtained. The switching process in this geometry is noted to be inherently coupled to long transient processes during both switching and relaxation. Multiple diffraction orders and diffuse light scattering were observed during the transient, prior to establishing homogenous orientation along the direction of the applied electric field, as shown in FIG. 16.

Figure 16:
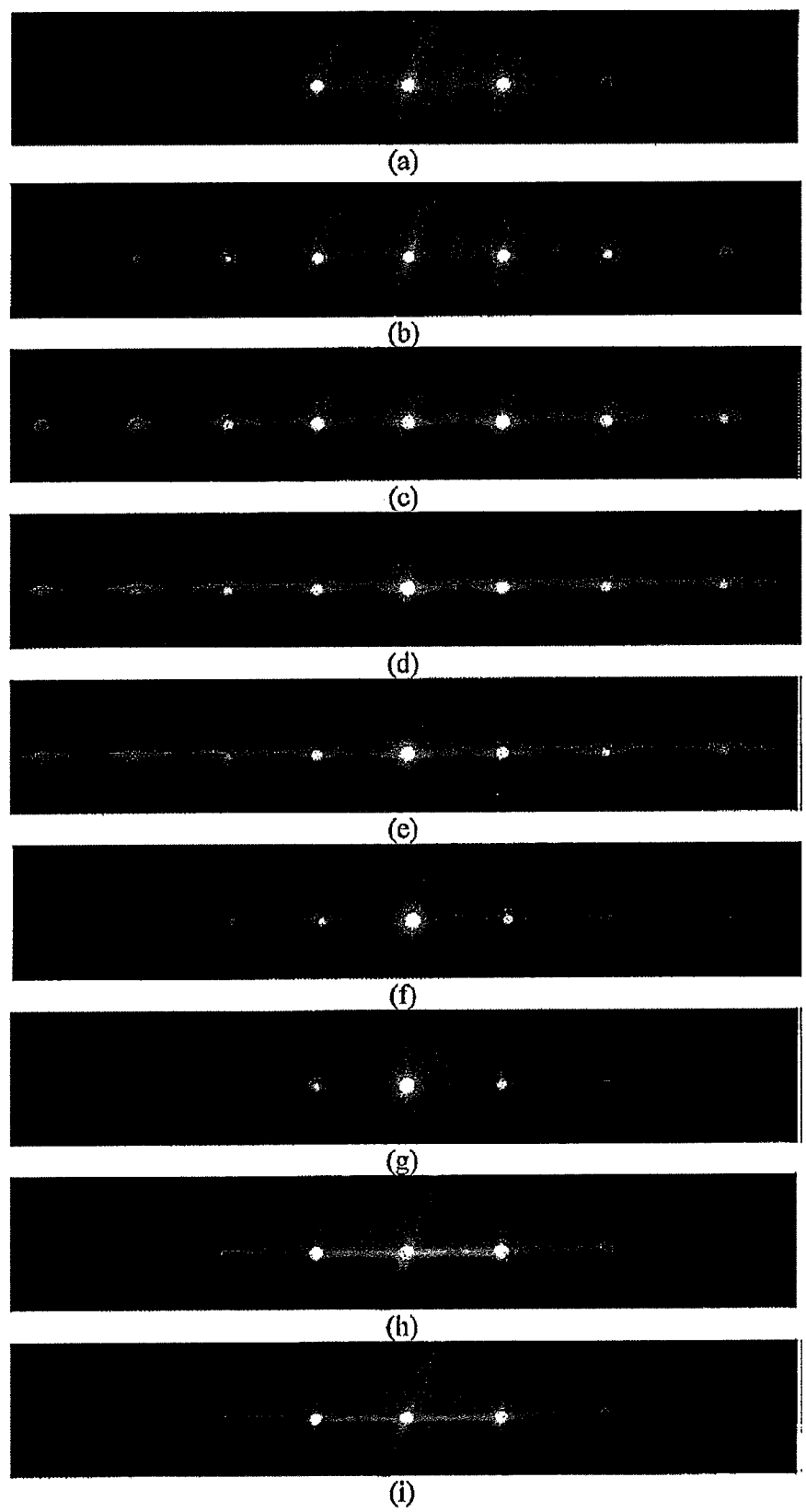
FIG. 16 shows diffraction patterns of the CDW with uniform ITO electrodes (a) in the absence of voltage, (b)-(f) evolution of the diffraction pattern with time when a 20V (peak-peak) sinusoidal voltage at 1 kHz is applied, (g) steady state diffraction pattern at 20V (peak-peak) sinusoidal voltage at 1 kHz, (h) obtained in the course of relaxation with switching off the voltage and (i) 1 hour after switching off the voltage.

FIG. 16 shows the evolution in time of the diffraction pattern obtained from out-of-plane switching of the uniform electrode CDW. FIG. 16(a) shows diffraction in the absence of voltage. FIGS. 13(b)-(f) show how the diffraction pattern evolves upon application of 20V (peak-to-peak) sinusoidal voltage at 1 kHz. The switching process proceeds through these stages until reaching the steady state shown in FIG. 16(g). A similar transition scenario takes place when switching off the voltage, however, the diffuse light scattering intermediate state shown in FIG. 16(h) persists with only a minor improvement for more than an hour, FIG. 16(i). The initial state, shown in FIG. 16(a), is recovered after one day (though not fully).

Figure 17:
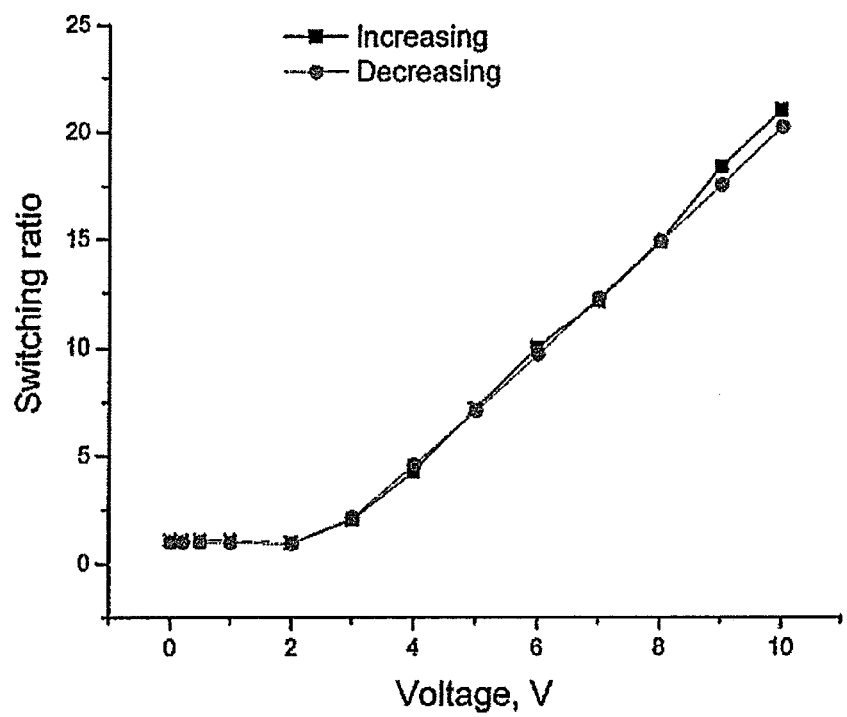
FIG. 17 shows switching contrast ratio as a function of voltage, for both increasing and decreasing voltage, applied to the CDW with uniform ITO electrodes.

The switching contrast ratio as a function of the voltage applied to the CDW with uniform ITO electrodes on both glass substrates is shown in FIG. 17. The efficiency was measured for both increasing and decreasing the applied voltage. A slight hysteresis can be seen during this process, depending on the rate of the voltage change. The diffraction efficiency is reduced by ~20 times at 10V.

Figure 18:
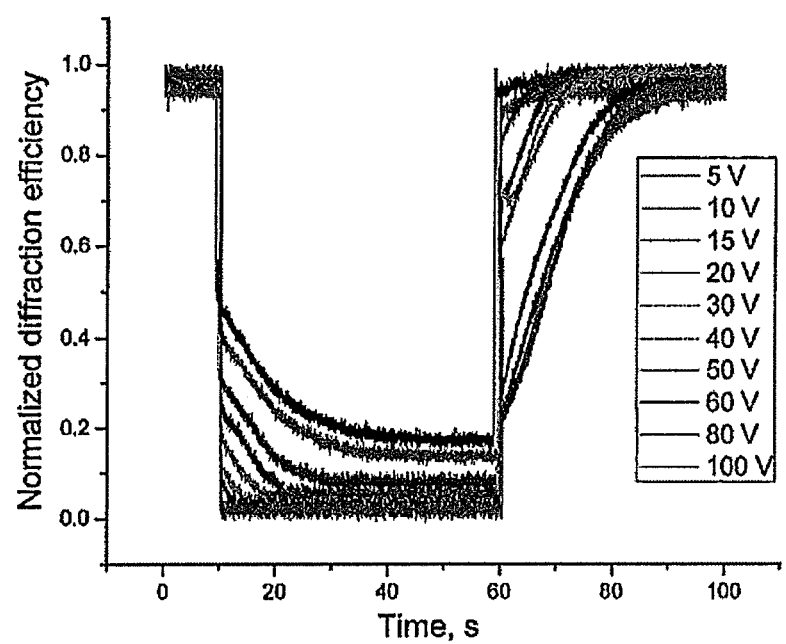
FIG. 18 shows normalized diffraction efficiency as a function of time, s, for a range of voltages from 5V to 100V, applied to the CDW with uniform ITO electrodes.
Figure 19:
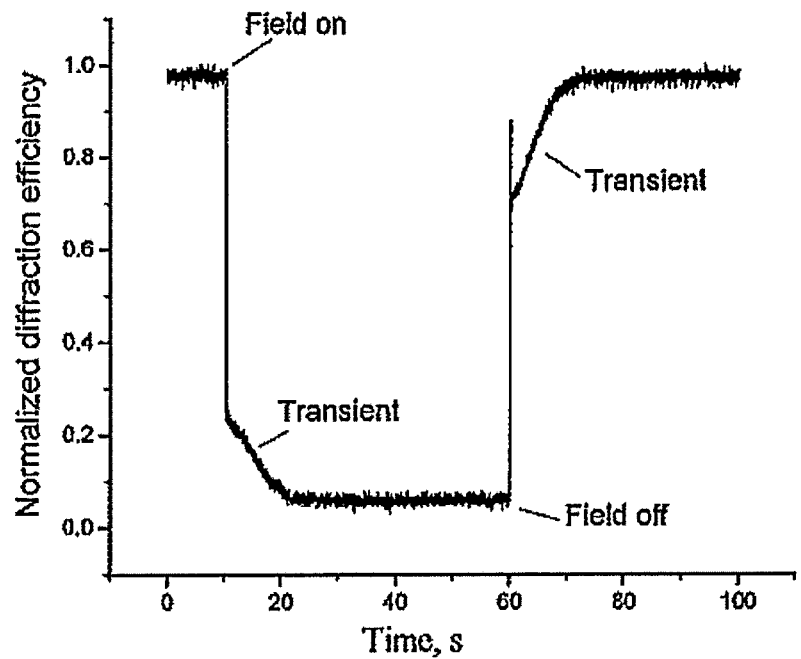
FIG. 19 shows normalized diffraction efficiency as a function of time, s, for (a) 20V and (b) 50V applied to the CDW with uniform ITO electrodes.
Figure 19:
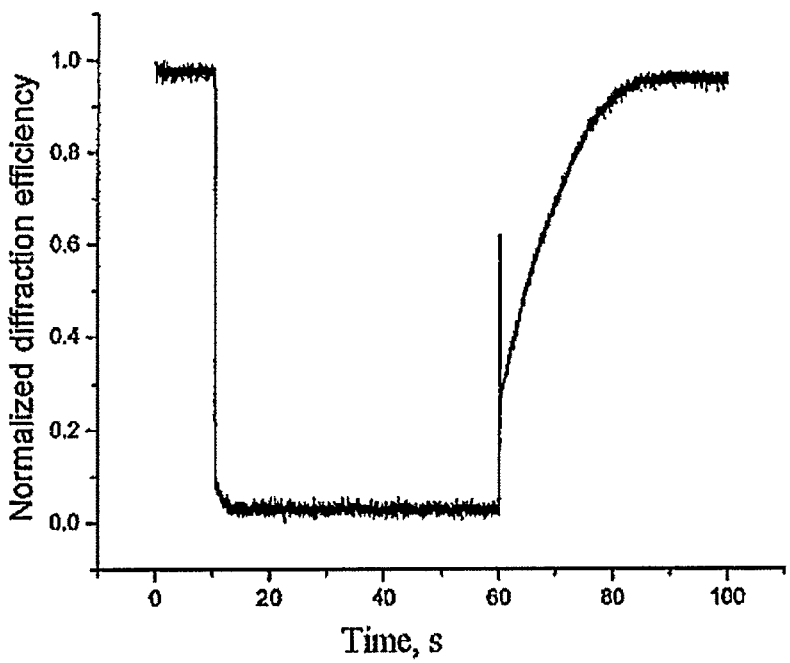

The dynamics of the out-of-plane switching of the uniform electrode CDW is shown in FIG. 18 and clearly exhibits all slow transient processes. Increasing the voltage shortens the transient stage of the grating decay and elongates its recovery. At low voltages, this transient stage for the grating decay is shorter compared to its recovery process. The details of the switching dynamics are shown in FIG. 19, for (a) 20V applied voltage and (b) 50V applied voltage.

Figure 20:
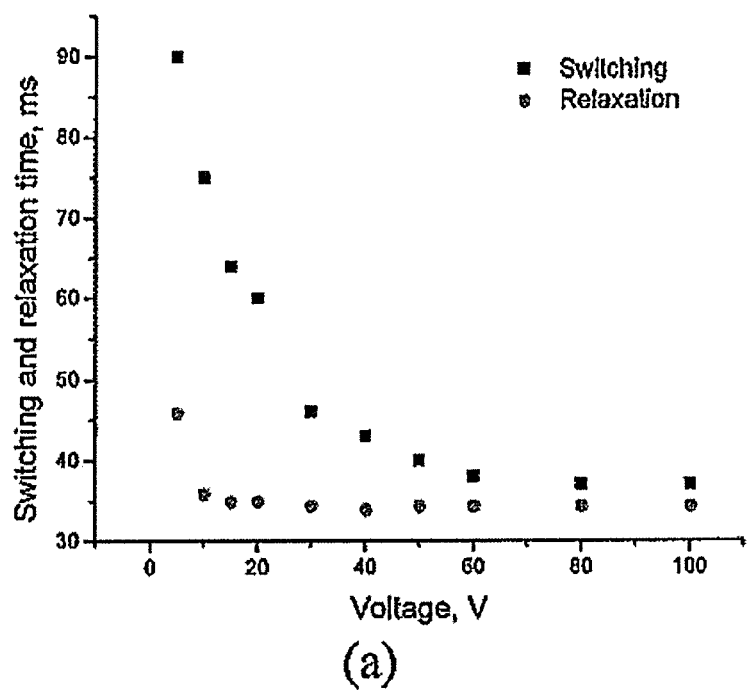
FIG. 20 shows (a) switching and relaxation time, ms, and (b) transient time, s, of the out-of-plane switching of the CDW with uniform ITO electrodes as a function of voltage, V.
Figure 20:
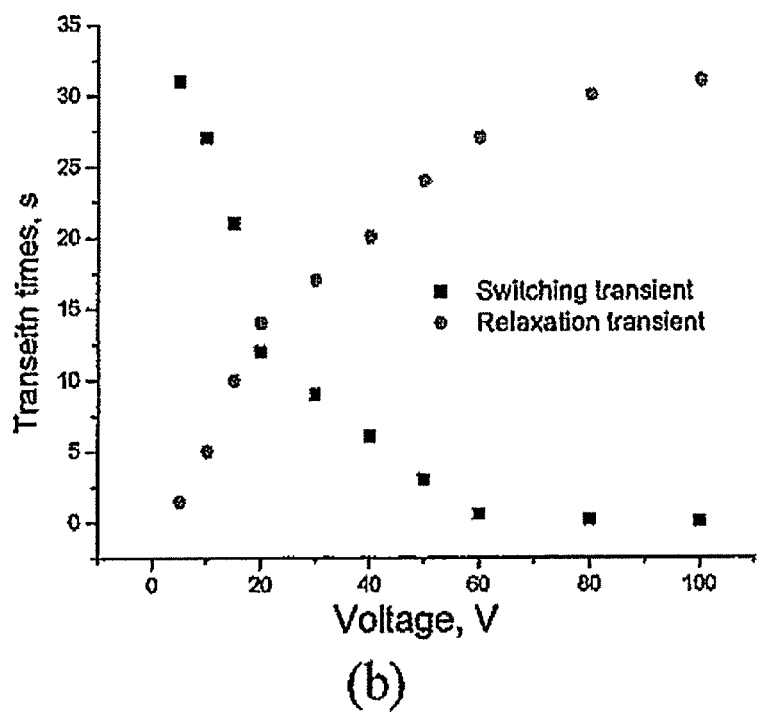

Thus the complex dynamics of out-of-plane switching of the uniform electrode CDW can be characterized by four characteristic times, as shown in FIG. 19(a): switching, relaxation, switching transient, and relaxation transient times. The switching and relaxation processes take place at the millisecond scale while the transient processes are at the scale of several seconds, as shown in FIG. 20. Note that the total time for the transient processes remains approximately constant on the order of 30 s.

The CDW according to the sixth embodiment is indeed shown to be advantageous compared to the uniform electrode CDW using out-of-plane switching.

Figure 21:
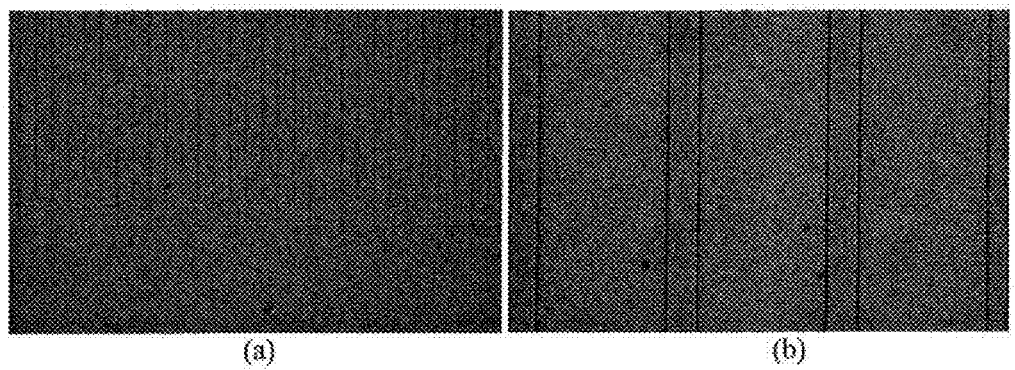
FIG. 21 shows the first substrate of a CDW according to a seventh embodiment of the invention having electrodes fabricated by direct deposition with a width of 10 µm and 40 µm distance between them viewed under a microscope at (a) 10× magnification and (b) 100× magnification.
Figure 22:
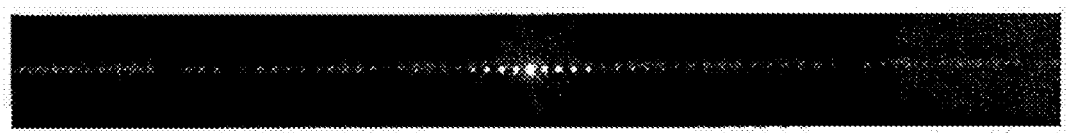
FIG. 22 shows the diffraction pattern of a He—Ne laser beam transmitted through the substrate shown in FIG. 21.

Referring to FIGS. 21 to 29, a seventh embodiment of the invention provides a CDW having the same general structure as shown in FIG. 5. In this embodiment, the positive and negative transparent electrodes 56, 58 comprise a transparent conductive material, such as ITO, provided on the first substrate layer 52, a float glass substrate in this example. The alternating series of positive and negative electrodes was formed by direct deposition of ITO on the first substrate layer. The electrodes each have a width of 10 μm and the separation between electrodes is 40 μm. Photographs of part of the first substrate layer showing the electrodes are shown in FIG. 21, with (a) 10× magnification and (b) 100× magnification. As can be seen in the photographs, the surface quality of the first substrate of this CDW proved very high. The surface quality if further evident in the clear diffraction pattern of a He—Ne laser beam transmitted through the first substrate layer, as shown in FIG. 22.

Figure 23:
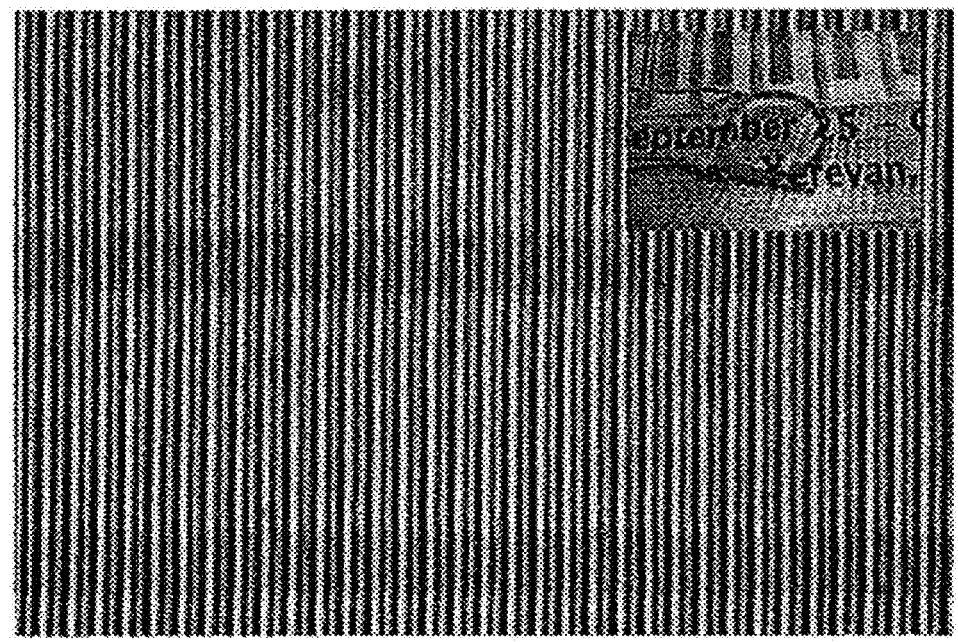
FIG. 23 shows a polarizing microscopy photograph of the CDW of the seventh embodiment, the inset shows a photograph of the CDW.
Figure 24:
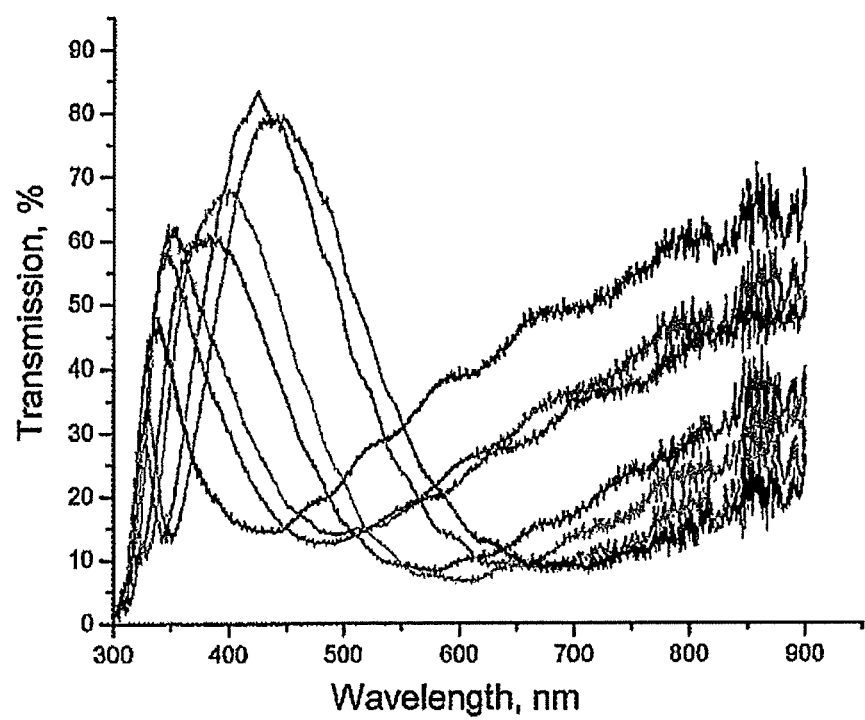
FIG. 24 shows optical transmission spectra of the CDW of the seventh embodiment, different curves corresponding to different areas of the CDW exhibiting the effect of thickness inhomogeneity.

The polarizing microscopy photograph of the CDW of the seventh embodiment shown in FIG. 23 also shows a practically defect free orientation structure and the transmission spectra of the CDW, for different areas of the CDW, shown in FIG. 24 exhibits high diffraction efficiency. As before, the different spectra exhibiting the effect of thickness inhomogeneity of the CDW.

Figure 25:
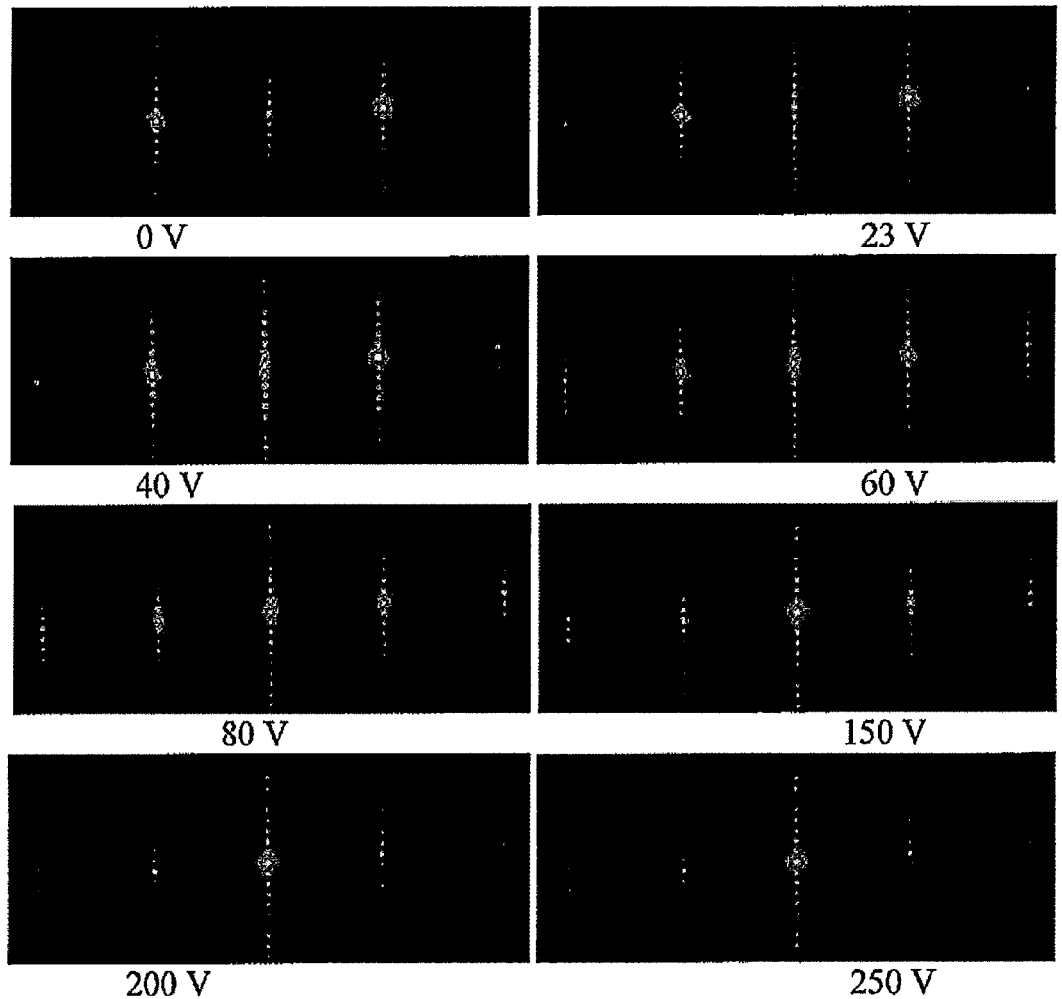
FIG. 25 shows diffraction patterns of a laser beam of 532 nm wavelength transmitted through the CDW of the seventh embodiment for different voltages applied to the electrodes (1 kHz sinusoidal)
Figure 26:
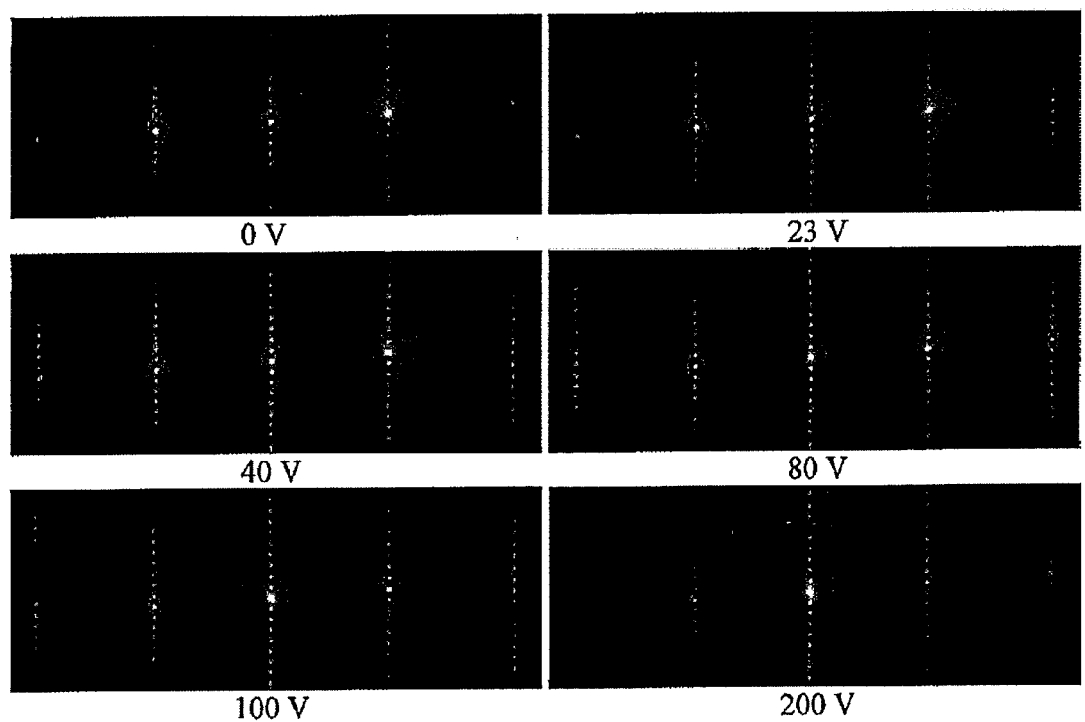
FIG. 26 shows diffraction patterns of a laser beam of 633 nm wavelength transmitted through the CDW of the seventh embodiment for different voltages applied to the electrodes (1 kHz sinusoidal)
Figure 27:
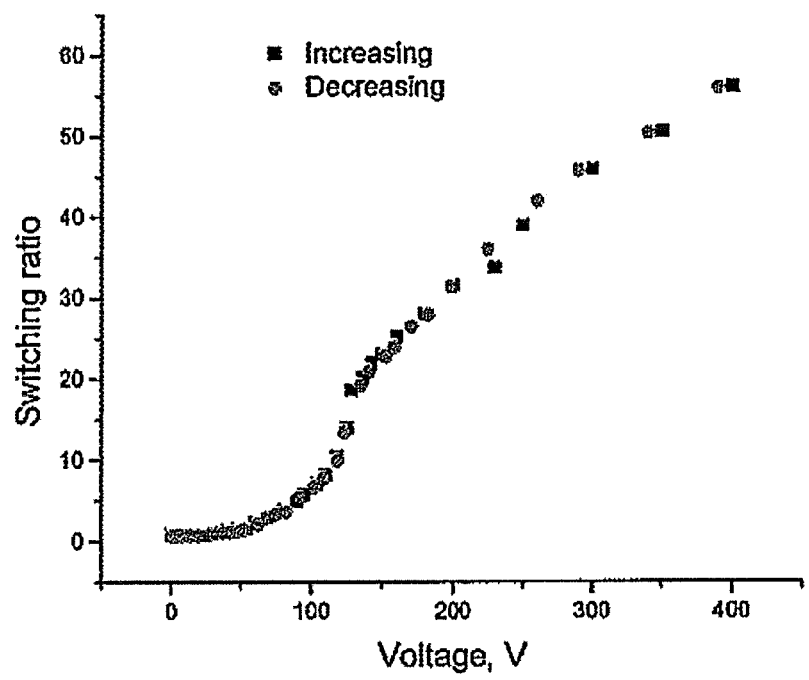
FIG. 27 shows switching ratio of the CDW of the sixth embodiment as a function of voltage, V, for a laser beam of (a) 532 nm (increasing and decreasing voltage) and (b) 633 nm.
Figure 27:
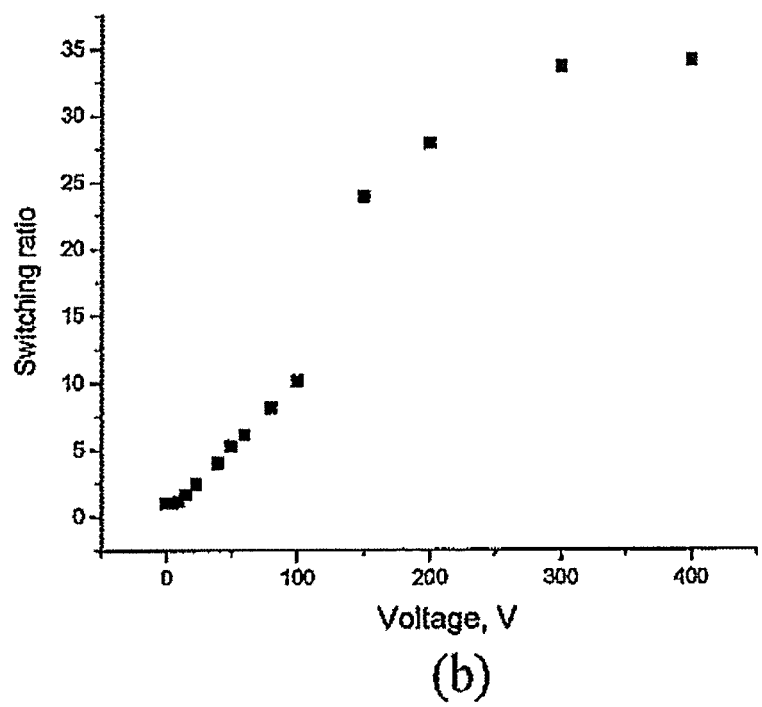

The diffraction patterns for laser beams of 532 nm and 633 nm wavelength at different values of applied voltage, kHz sinusoidal form, are shown in FIG. 25 and FIG. 26, respectively. At the selected position on the CDW at which the diffraction patterns were taken, the $0^{th}$ order diffraction is initially rather low corresponding to nearly 90% diffraction efficiency into the $1^{st}$ orders.

Figure 28:
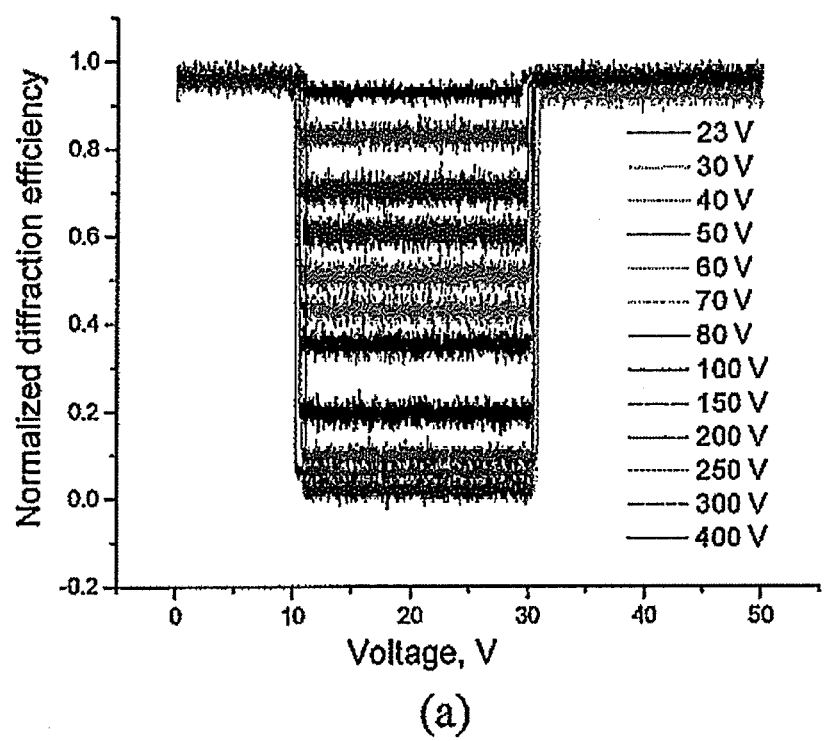
FIG. 28 shows normalized diffraction efficiency of the CDW of the seventh embodiment as a function of (a) voltage, V, and (b) time, s, for a range of voltages from 5V to 400V.
Figure 28:
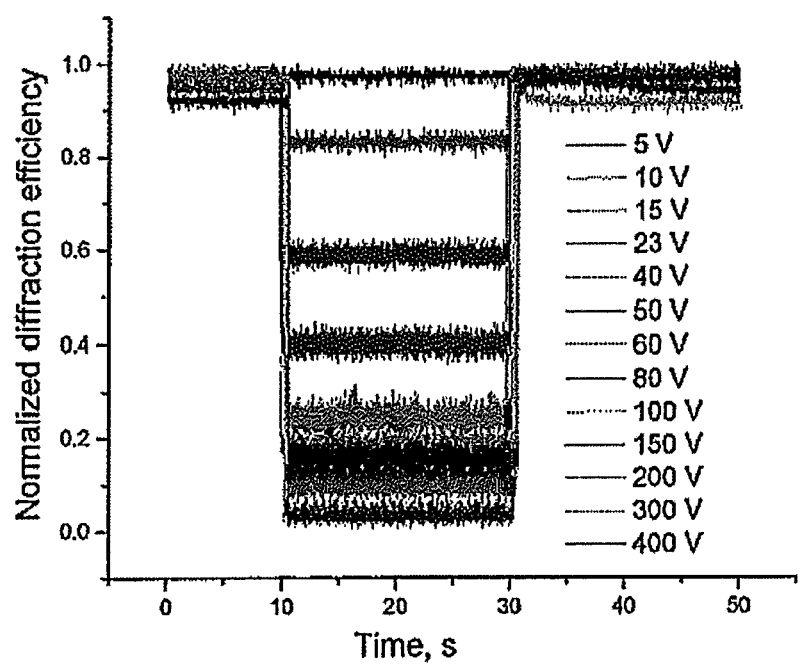

The switching contrast ratio as a function of voltage for both the laser beams of 532 nm and 633 nm wavelength is shown in FIGS. 27(a) and (b) respectively. No transient effects are observed in the dynamics of the switching process for up to voltages as high as 400V, as can be seen in FIG. 28.

Figure 29:
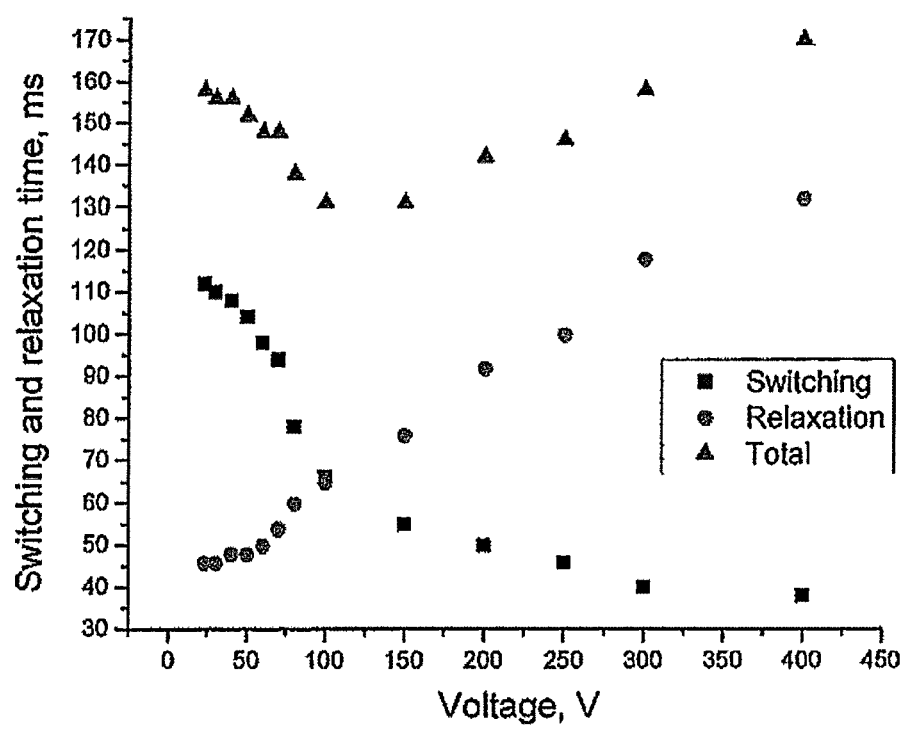
FIG. 29 shows switching and relaxation time, ms, as a function of voltage, V of the CDW of the seventh embodiment.

The switching and relaxation time as a function of voltage of the CDW of the seventh embodiment, for a 532 nm laser beam, are shown in FIG. 29. As can be seen, the shortest switching times are obtained at low voltages. The sum of the switching and relaxation times (total) has, however, a minimum at ~100V.

The CDWs of the sixth and seventh embodiments therefore enable electro-optical in-plane-switching to be performed in a fast, reversible, and well controlled manner, overcoming the problems typically encountered in material structures with periodic modulation of the liquid crystal optical axis; generation of defects, hysteresis, and long transients. Use of ITO electrodes formed by direct deposition not only improved the diffraction efficiency but also the speed of system response as compared to electrodes formed by etching. Increasing voltage proved to decrease the switching time while increasing the relaxation time. The total of the transient times has a minimum at an intermediate voltage value.

Minimizing the diffraction on the electrode pattern is one of the problems to overcome on the way of applications of electro-optical switching of CDWs. Note that the presence of liquid crystal considerably reduces this diffraction due to index matching. Also, note that the diffraction that is highly visible for a laser beam, particularly, a green beam, may not be as much affecting vision/imaging through such component for a broadband incoherent light.

Figure 30:
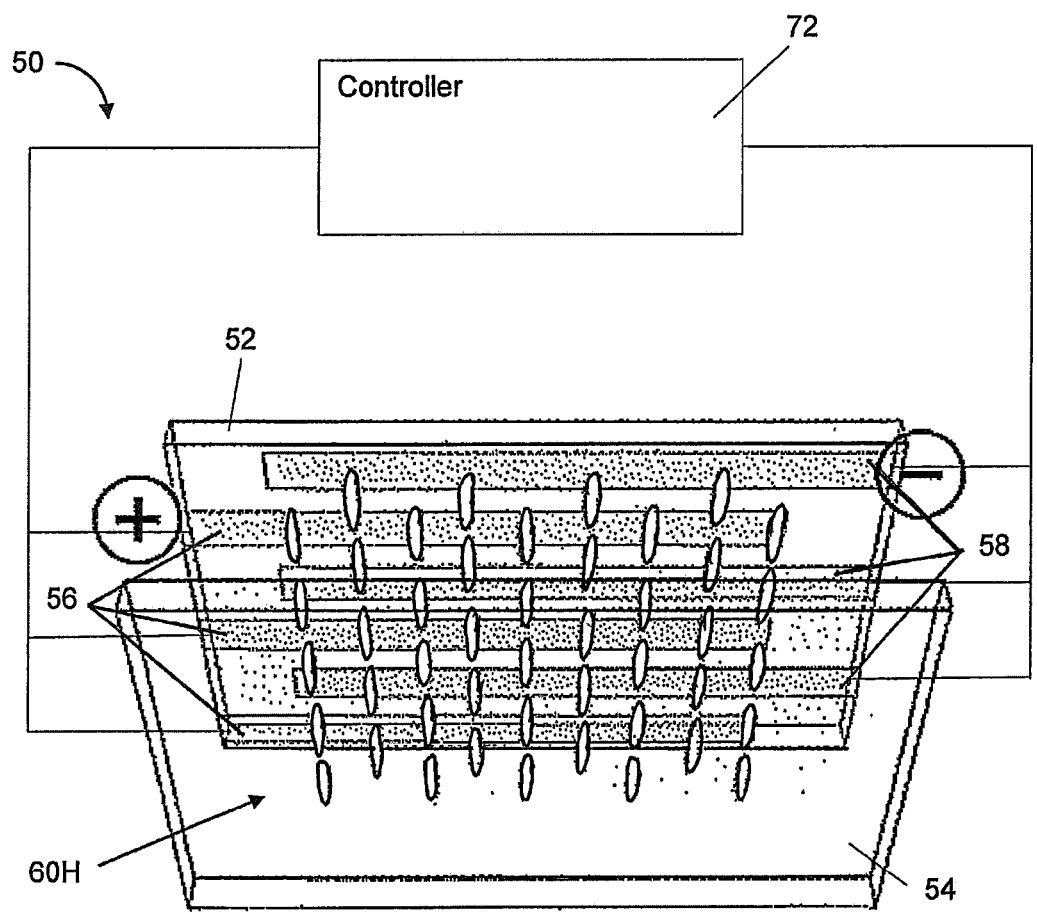
FIG. 30 an exploded diagrammatic representation of an electro-optical switching system according to an eighth embodiment of the invention.

Referring to FIG. 30, an eighth embodiment of the invention provides an electro-optical switching system 70 comprising a CDW 50 and a controller 72.

The CDW 50 is as shown in FIG. 5 and may be according to any of the fifth to seventh embodiments described above.

The controller 72 is arranged to deliver an electric voltage to the electrodes 56, 58 of the cycloidal diffractive waveplate 50.

It will be appreciated that the specific orientations used within these FIGURES to demonstrate the apparatus functionality are by way of example only.

The present disclosure is directed to each individual feature, system, material, and/or method described herein. In addition, any combination of two or more such features, systems, materials, and/or methods, if such features, systems, materials, and/or methods are not mutually inconsistent, is included within the scope of the present invention. To avoid undue repetition, not all features are discussed in conjunction with every aspect, embodiment or practice of the disclosure. Features described in conjunction with one aspect, embodiment or practice are deemed to be includable with others absent mutual inconsistency or a clear teaching to the contrary. In some instances, features will be discussed generally rather than in detail in conjunction with a specific aspect, embodiment or practice, and it is understood that such features can be included in any aspect, embodiment or practice, again absent mutual inconsistency or a clear teaching to the contrary.

Those of ordinary skill in the art will readily envision a variety of other means and structures for performing the functions and/or obtaining the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teachings of the present invention are used.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims, and equivalents thereto, the invention may be practiced otherwise than as specifically described.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 8th Edition, Revision 8. Furthermore, statements in the specification, such as, for example, definitions, are understood to be open ended unless otherwise explicitly limited.

The phrase "A or B" as in "one of A or B" is generally meant to express the inclusive "or" function, meaning that all three of the possibilities of A, B or both A and B are included, unless the context clearly indicates that the exclusive "or" is appropriate (i.e., A and B are mutually exclusive and cannot be present at the same time). "At least one of A, B or C" (as well as "at least one of A, B and C") reads on any combination of one or more of A, B and C, including, for example the following: A; B; C; A & B; A & C; B & C; A & B; as well as on A, B & C.

It is generally well accepted in patent law that "a" means "at least one" or "one or more." Nevertheless, there are occasionally holdings to the contrary. For clarity, as used herein "a" and the like mean "at least one" or "one or more." The phrase "at least one" may at times be explicitly used to emphasize this point. Use of the phrase "at least one" in one claim recitation is not to be taken to mean that the absence of such a term in another recitation (e.g., simply using "a") is somehow more limiting. Furthermore, later reference to the term "at least one" as in "said at least one" should not be taken to introduce additional limitations absent express recitation of such limitations. For example, recitation that an apparatus includes "at least one widget" and subsequent recitation that "said at least one widget is colored red" does not mean that the claim requires all widgets of an apparatus that has more than one widget to be red. The claim shall read on an apparatus having one or more widgets provided simply that at least one of the widgets is colored red. Similarly, the recitation that "each of a plurality" of widgets is colored red shall also not mean that all widgets of an apparatus that has more than two red widgets must be red; plurality means two or more and the limitation reads on two or more widgets being red, regardless of whether a third is included that is not red, absent more limiting explicit language (e.g., a recitation to the effect that each and every widget of a plurality of widgets is red).

ADDITIONAL REFERENCES

L. M. Blinov, V. G. Chigrinov, *Electrooptics Effects in Liquid Crystal Materials*, Springer, N.Y., 1996, 464 pages.

*Liquid Crystals in Complex Geometries Formed by Polymer and Porous Networks*, Edited by G. P. Crawford and S. Zumer, Taylot & Francis, 2003.

S. T. Wu and D. K. Yang, *Reflective Liquid Crystal Displays*, John Wiley & Sons, West Sussex, UK, 2001.

I. Dierking, "Polymer Network-Stabilized Liquid Crystals", Advanced Materials, 12, 167-181, 2000.

P. Yeh, C. Gu, *Optics of Liquid Crystal Displays*, Wiley, N.Y., 2010, 770 pages.

What is claimed is:

1. A method of fabricating a cycloidal diffractive waveplate, the method comprising:

forming a first substrate;

forming a plurality of transparent positive electrodes on the first substrate, and forming a plurality of transparent negative electrodes on the first substrate, the transparent positive electrodes and the transparent negative electrodes being arranged in an alternating series;

forming a second substrate without electrodes; and forming a liquid crystal layer between the first substrate and the second substrate, the liquid crystal layer being formed of liquid crystal molecules each having an optical axis with positive dielectric anisotropy and the liquid crystal layer being formed with a periodic molecular structure, and applying an electric voltage to the alternating series of the transparent positive electrodes and the transparent negative electrodes on the first substrate to switch the liquid crystal layer between a diffractive state in which the optical axes of the liquid crystal molecules are periodically rotated across a plane of the waveplate and a non-diffractive state in which the optical axes of the liquid crystal molecules are orientated in the same direction in the plane of the waveplate, wherein the applied electric voltage to the alternating series of the plurality of transparent positive electrodes and the plurality of transparent negative electrodes on the first substrate are configured to produce an electric field in the plane of the waveplate, and wherein the liquid crystal layer is switched between the diffractive state and the non-diffractive state.

2. The method of claim 1, wherein transparent positive electrodes and transparent negative electrodes are formed by direct deposition of a transparent conductive material onto the first substrate.

3. The method of claim 1, wherein the alternating series of the plurality of transparent positive electrodes and the plurality of transparent negative electrodes are arranged across the first substrate in a first direction and the liquid crystal layer has a modulation axis which is orientated in a second direction, substantially perpendicular to the first direction, within a plane of the diffractive waveplate.

4. The method of claim 1, wherein the first substrate and the second substrate are each made from one of float glass, fused silica, polymer, and materials transparent for infrared wavelengths.

5. A cycloidal diffractive waveplate comprising:
a first substrate;
a second substrate;
a liquid crystal layer provided between the first substrate and the second substrate, the liquid crystal layer formed of liquid crystal molecules each having an optical axis with positive dielectric anisotropy and the liquid crystal layer having a periodic molecular structure, and wherein the liquid crystal layer has a diffractive state in which the optical axes of the liquid crystal molecules are rotated across a plane of the waveplate and a non-diffractive state in which the optical axes of the liquid crystal molecules are orientated in the same direction in the plane of the waveplate; and
a plurality of transparent positive electrodes and a plurality of transparent negative electrodes both being provided on the first substrate and the electrodes arranged in an alternating series, the second substrate without having electrodes, wherein an electric voltage applied to the alternating series of the plurality of transparent positive electrodes and the plurality of transparent negative electrodes on the first substrate are configured to produce an electric field in the plane of the waveplate, and the liquid crystal layer is switched from the diffractive state to the non-diffractive state.

6. The cycloidal diffractive waveplate of claim 5, wherein said alternating series of the plurality of transparent positive electrodes and the plurality of transparent negative electrodes comprise a transparent conductive material directly deposited on the first substrate to form electrodes without affecting substrate areas without electrodes.

7. The cycloidal diffractive waveplate of claim 5, wherein the alternating series of the plurality of transparent positive electrodes and the plurality of transparent negative electrodes are arranged across the first substrate in a first direction and the liquid crystal layer has a modulation axis which is orientated in a second direction, substantially perpendicular to the first direction, within a plane of the waveplate.

8. The cycloidal diffractive waveplate of claim 5, wherein the first substrate and the second substrate are each made from one of float glass, fused silica, polymer, and materials transparent for infrared wavelengths.

* * * * *